US007536469B2

(12) United States Patent
Chou et al.

(10) Patent No.: US 7,536,469 B2
(45) Date of Patent: May 19, 2009

(54) SYSTEM AND PROCESS FOR CONTROLLING THE CODING BIT RATE OF STREAMING MEDIA DATA EMPLOYING A LIMITED NUMBER OF SUPPORTED CODING BIT RATES

(75) Inventors: Philip Chou, Bellevue, WA (US); Anders Klemets, Redmond, WA (US); Cheng Huang, St. Louis, MO (US)

(73) Assignee: Microsoft Corporation, Redmond, WA (US)

( * ) Notice: Subject to any disclaimer, the term of this patent is extended or adjusted under 35 U.S.C. 154(b) by 912 days.

(21) Appl. No.: 11/010,113

(22) Filed: Dec. 10, 2004

(65) Prior Publication Data

US 2006/0165166 A1 Jul. 27, 2006

(51) Int. Cl.
G06F 15/16 (2006.01)
(52) U.S. Cl. ........................ 709/231; 709/232; 709/233; 709/234; 709/235
(58) Field of Classification Search ........................ None
See application file for complete search history.

(56) References Cited

U.S. PATENT DOCUMENTS

| 5,565,924 | A | 10/1996 | Haskeli et al. |
| 5,724,099 | A | 3/1998 | Hamdi et al. |
| 6,438,141 | B1 | 8/2002 | Hanko et al. |
| 6,637,031 | B1 * | 10/2003 | Chou ........................... 709/247 |
| 6,657,568 | B1 * | 12/2003 | Coelho et al. .................. 341/60 |
| 6,731,947 | B2 | 5/2004 | Hoagland et al. |
| 6,895,054 | B2 | 5/2005 | Li |
| 6,937,770 | B1 | 8/2005 | Oguz et al. |
| 6,982,969 | B1 | 1/2006 | Cameal et al. |
| 7,016,970 | B2 * | 3/2006 | Harumoto et al. ........... 709/233 |
| 7,324,535 | B1 | 1/2008 | Goss et al. |
| 2002/0048259 | A1 | 4/2002 | Adam et al. |
| 2002/0105951 | A1 | 8/2002 | Hannuksela et al. |
| 2002/0136164 | A1 | 9/2002 | Fukuda et al. |
| 2003/0171934 | A1 | 9/2003 | Zhang et al. |

(Continued)

OTHER PUBLICATIONS

Ribas-Corbera, J., P. A. Chou, S. Regunathan, A flexible decoder buffer model for JVT video coding, *IEEE Int'l Conf. on Image Processing*, Sep. 2002, Rochester, NY, vol. 2, pp. 493-496.

(Continued)

*Primary Examiner*—Hassan Phillips
(74) *Attorney, Agent, or Firm*—Lyon & Harr, LLP; Richard T. Lyon

(57) ABSTRACT

A system and process for controlling the coding bit rate of streaming media data is presented where a server streams data that exhibits one of a number of coding bit rates supported by the server. Initially, the server chooses the coding bit rate. However, after this startup period, the client provides coding bit rate requests. The server transmits the streaming media data at the most appropriate supported coding bit rate closest to the rate requested. The coding bit rates requested are those estimated to provide a high quality playback of the streaming data while still keeping a decoder buffer of the client filled to a desired level. A leaky bucket model is incorporated so that the changes in buffer duration due to natural variation in the instantaneous coding bit rate are not mistaken for changes in buffer duration due to network congestion.

41 Claims, 9 Drawing Sheets

U.S. PATENT DOCUMENTS

| | | | |
|---|---|---|---|
| 2003/0195977 A1* | 10/2003 | Liu et al. | 709/231 |
| 2004/0190606 A1 | 9/2004 | Deshpande | |
| 2004/0267956 A1* | 12/2004 | Leon et al. | 709/231 |
| 2005/0021830 A1* | 1/2005 | Urzaiz et al. | 709/234 |
| 2005/0069039 A1 | 3/2005 | Crinon | |
| 2006/0026294 A1* | 2/2006 | Virdi et al. | 709/232 |
| 2007/0143490 A1* | 6/2007 | Gallou et al. | 709/231 |

OTHER PUBLICATIONS

European Search Report, Application No. EP05111156.5, completed Apr. 27, 2006, received May 19, 2006.

Co-pending U.S. Appl. No. 11/010,114, "A System and Process for Controlling the Coding Bit of Streaming Media Data Employing a Linear Quadratic Control Technique and Leaky Bucket Model," filed Dec. 10, 2004.

Co-pending U.S. Appl. No. 11/010,040, "A System and Process for Performing and Exponentially Weighted Moving Average on Streaming Data to Establish a Moving Average Bit Rate," filed Dec. 10, 2004.

Anderson, B. D. O. and J. B. Moore, Optimal Control: Linear Quadratic Methods, Prentice Hall, 1990.

Chou, P. A. and Z. Miao, Rate-distortion optimized streaming of packetized media, *Microsoft Research Technical Report MSR-TR-2001-35*, Feb. 2001.

Conklin, G. J., G. S. Greenbaum, K. O. Lillevold, A. F. Lippman, and Y. A. Reznik, Video coding for streaming media delivery on the Internet, *IEEE Trans. Circuits and Sys's. for Video Tech.*, 2001, vol. 11, No. 3, pp. 269-281.

de Cuetos, P. and K. W. Ross, Adaptive rate control for streaming stored fine-grained scalable video, *Proc. Int'l. Workshop on Network and Operating Sys's. for Digital Audio and Video (NOSSDAV)*, Miami Beach, FL, May 2002.

Keshav, S., Packet-pair flow control, http://www.cs.cornell.edu/~skeshav/papers.html, 2005.

Kim, B.-J., Z. Xiong and W. A. Pearlman, Low bit-rate scalable video coding with 3D set partitioning in hierarchical trees (3-D SPIHT), *IEEE Trans. Circuits and Sys's. for Video Tech.*, 2000, vol. 18, No. 8, pp. 1374-1387.

Li, J., Embedded audio coding (eac) with implicit psychoacoustic masking, *Proc. Int'l. Conf. on Multimedia*, 2002, pp. 592-601.

Rejaie, R., M. Handley and D. Estrin, Layered quality adaptation for Internet streaming video, *IEEE J. Selected Areas in Comm.*, 2000, vol. 18, No. 12., pp. 2530-2543.

Ribas-Corbera, J., and P. A. Chou and S. Regunathan, A generalized hypothetical reference decoder for H.264/AVC, *IEEE Trans. Circuits and Sys's. for Video Tech.*, Jul. 2003, vol. 13, No. 7.

Ribeiro, R., R. H. Riedi, J. Navratil, L. Corrtell and R. G. Baraniuk, Pathchirp: Efficient available bandwidth estimation for network paths, *Proc. Passive and Active Measurement Workshop (PAM)*, La Jolla, CA Apr. 2003.

Wu F., S. Li, and Y.-Q. Zhang, A framework for efficient progressive fine granularity scalable video coding, *IEEE Trans. Circuits and Sys's. for Video Tech.*, 2001, vol. 11, No. 3, pp. 301-317.

Zhang, Q., Y.-Q. Zhang and W. Zhu, Resource allocation for multimedia streaming over the Internet, *IEEE Trans. Multimedia*, 2001, vol. 3, No. 3, pp. 339-355.

"Moving Average" definition, Wikipedia.org, pp. 1-6.

Rate control in DCT video coding for low-delay communications, J. Ribas-Corbera, S. Lei, Circuits and systems for video technology, IEEE Trans. on vol. 9, Issue 1, Feb. 1999, pp. 172-185.

Low-delay rate control for DCT video coding via p-domain source modeling, Z. He, Y. K. Kim, S. K. Mitra, Circuits and systems for video technology, IEEE Trans. on vol. 11, Issue 8, Aug. 2001, pp. 928-940.

Source model for transform video coder and its application, Variable frame rate coding, J.-J. Chen, H.-M. Hang, Circuits and systems for video technology, IEEE Trans. on vol. 7, Issue 2, Apr. 1997, pp. 299-311.

Office Action, Hassan A. Philips, U.S. Appl. No. 11/010,040, filed Aug. 7, 2008.

Office Action, Lashanya R. Nash, U.S. Appl. No. 11/010,114, filed Jul. 22, 2008.

* cited by examiner

SYSTEM AND PROCESS FOR CONTROLLING THE CODING BIT RATE OF STREAMING MEDIA DATA EMPLOYING A LIMITED NUMBER OF SUPPORTED CODING BIT RATES

BACKGROUND

1. Technical Field

The invention is related to controlling the coding bit rate of streaming media, and more particularly to a system and process for controlling the coding bit rate of streaming media data that provides fast startup, continuous playback, and maximal quality and smoothness over the entire streaming session.

2. Background Art

Perhaps the major technical problem in streaming media on demand over the Internet is the need to adapt to changing network conditions. As competing communication processes begin and end, the available bandwidth, packet loss and packet delay all fluctuate. Network outages lasting many seconds can and do occur. Resource reservation and quality of service support can help, but even they cannot guarantee that network resources will be stable. If the network path contains a wireless link, for example, its capacity may be occasionally reduced by interference. Thus it is necessary for commercial-grade streaming media systems to be robust to hostile network conditions. Moreover, such robustness cannot be achieved solely by aggressive (nonreactive) transmission. Even constant bit rate transmission with re-transmissions for every packet loss cannot achieve a throughput higher than the channel capacity. Some degree of adaptivity to the network is therefore required.

End users expect that a good streaming media system will exhibit the following behavior: content played back on demand will start with low delay; once started, it will play back continuously (without stalling) unless interrupted by the user; and it will play back with the highest possible quality given the average communication bandwidth available. To meet these expectations in the face of changing network conditions, buffering of the content at the client before decoding and playback is required.

Buffering at the client serves several distinct but simultaneous purposes. First, it allows the client to compensate for short-term variations in packet transmission delay (i.e., "jitter"). Second, it gives the client time to perform packet loss recovery if needed. Third, it allows the client to continue playing back the content during lapses in network bandwidth. And finally, it allows the content to be coded with variable bit rate, which can dramatically improve overall quality. Note that even so-called constant bit rate (CBR) coded content is actually coded with variable bit rate within the constraints of a decoding buffer of a given size. The larger the decoding buffer size, the better the quality. The required decoding buffering is part of the larger client buffer.

The size of the client buffer can be expressed as the number of seconds of content in the buffer, called the buffer duration. The buffer duration tends to increase as content enters the buffer and tends to decrease as content leaves the buffer. Content leaves the buffer when it is played out, at a rate of v seconds of content per second of real time, where v is the playback speed (typically 1 for normal playback, but possibly more than 1 for high speed playback or less than 1 for low speed playback). Content enters the buffer when it arrives at the client over the network, at a rate of $r_a/r_c$ seconds of content per second of real time, where $r_a$ is the arrival rate, or average number of bits that arrive at the client per second of real time, and $r_c$ is the coding bit rate, or the average number of bits needed to encode one second of content. Thus the buffer duration can be increased by increasing $r_a$, decreasing $r_c$, and/or decreasing v (and vice versa for decreasing the buffer duration). Although the buffer duration can be momentarily controlled by changing $r_a$ or changing v, these quantities are generally not possible to control freely for long periods of time. The arrival rate $r_a$ on average is determined by the network capacity, while the playback speed v on average is determined by user preference. Thus if the network capacity drops dramatically for a sustained period, reducing the coding bit rate $r_c$ is the only appropriate way to prevent a rebuffering event in which playback stops (v=0) while the buffer refills.

Thus, adaptivity to changing network conditions requires not only a buffer, but also some means to adjust the coding bit rate $r_c$ of the content. This can be done by stream switching in combination with multi bit rate (MBR) coding or coarse grained or fine grained scalable coding. Today's commercial streaming media systems [1] rely on MBR coding as well as thinning, which is a form of coarse grained scalability. In MBR coding, semantically identical content is encoded into alternative bit streams at different coding bit rates and stored in the same media file at the server, allowing the content to be streamed at different levels of quality corresponding to the coding bit rates $r_c$, possibly using bit stream switching [2]. In coarse grained scalable coding (such as MPEG-2/4 temporal or SNR scalability) the content is encoded into several sub-streams or layers, so that the coding bit rate $r_c$ can be changed in large deltas by adding or dropping (at possibly restricted times) one layer of content at a time. Thinning is a special case of coarse grained scalability in which dependent video frames (P and B frames) are dropped before independent video frames (I frames), which are in turn are dropped before audio frames. Future commercial systems may support fine grained scalability (FGS) as well. Fine grained scalable coding (such as 3D SPIHT [6], MPEG-4 FGS [7], or EAC [8]) allows the coding bit rate $r_c$ to change at any time in deltas sometimes as small as one byte per presentation. FGS coding offers great flexibility in adapting to variable network conditions, and can demonstrably improve quality under such conditions.

Some examples of existing technology that adjusts the coding bit rate $r_c$ of the content in an attempt to adapt to changing network conditions includes de Cuetos and Ross [9], which decouples the transmission rate and the coding bit rate. They assume that the transmission rate is determined by the network transport protocol (TCP or TFRC). Based on this, they develop a heuristic real time algorithm for adaptive coding bit rate control and compare its performance to an optimal offline coding bit rate control policy if the transmission rate is given prior to streaming. The work of Rejaie, Handley and Estrin [4] proposes a scheme for transmitting layered video in the context of unicast congestion control, which basically includes two mechanisms. One mechanism is a coarse-grained mechanism for adding and dropping layers (changing the overall coding bit rate and quality). The other is a fine-grained interlayer bandwidth allocation mechanism to manage the receiver buffer (not changing the overall coding bit rate or quality). A potential issue with this approach is that it changes the coding bit rate by adding or dropping one (presumably coarse) layer at a time. If the layers are fine-grained, as in the case of FGS coded media, then adding or dropping one (fine-grained) layer at a time typically cannot provide a prompt enough change in coding bit rate. Moreover, since the adding and dropping mechanism is rather empirical, the mechanism may simply not be suitable for FGS media. The work of Q. Zhang, Zhu and Y-Q. Zhang [5] proposes a resource allocation scheme to adapt the coding bit rate to estimated network bandwidth. The novelty of their approach is that they consider minimizing the distortion (or equivalently maximizing the quality) of all applications, such as file-transfers and web browsing in addition to audio/video streaming. However, their optimization process does not include the smoothness of individual streams and might lead to potential quality fluctuations.

However, even with buffering and the ability to adjust the coding bit rate, existing technologies for streaming media on demand over the Internet suffer from two problems:

1. Playback often stalls during network congestion. That is, during playback of high bit rate content, if the network bit rate drops below the content bit rate, the client buffer runs out of content and playback stops while the client rebuffers (known as a "rebuffering" event).
2. Start-up delay is often too long (about 5 seconds).

There are existing solutions to both of these problems, but they do not always work well. One solution to the first problem is to stream the content encoded at a coding bit rate that is low relative to the average bit rate transmitted over the network (the transmission bit rate). This will enable the buffer to build up over time. With such a large reserve of unplayed information on the client, temporary network congestion will not affect playback. However, this solution has two problems. First, the coding bit rate of the content is not as high as the average transmission bit rate of the network and hence the quality is lower than it could be. Second, the buffer can grow nearly as large as the streamed file itself. This may demand too many resources on the client device.

Another solution to the first problem is to try to maintain the client buffer at a constant level (typically about 10 seconds), while switching between different coding bit rates for the same content, trying to match the transmission bit rate of the network. However, rebuffering events are still commonly observed in practice, because choosing the right time to switch streams is difficult. One reason that it is difficult is that there are natural variations in the instantaneous coding bit rate of the content, even in so-called constant bit rate encodings, which can confuse the client buffer management algorithm.

The second problem above (long start-up delay) also has multiple solutions. One solution is to fill up the client buffer quickly, with a quick initial transmission rate burst. With the client buffer full, playback can safely begin. However, this solution has several problems. First, it is only applicable when there is sufficient "headroom" in the network to increase the transmission bit rate for a few seconds. Thus it is usually not applicable for modem connections, for example. Second, it stresses the network, causing other applications in the network to back off. It has been shown that during the burst period, there can be as much as 80% packet loss, causing all TCP connections sharing the same bottleneck to back off. Third, by implication, if there is headroom in the network for bursting, then the streaming application may not be using the full bandwidth available to it during the remainder of the file, meaning that quality is lower than it should be.

Another solution to the second problem is to play back the content slower than real time, allowing playback to begin while the client buffer builds up. This is an innovative solution, but has the obvious temporal distortion.

A final solution to the second problem is to lower temporarily the coding bit rate of the content below the transmission bit rate of the network, allowing playback to begin while the client buffer builds up. This is a solution proposed by Chou et al. in [13].

The system and process of the present invention resolve the problems of the existing techniques and provide fast startup, continuous playback, and maximal quality and smoothness over the entire streaming session.

It is noted that in the preceding paragraphs, as well as in the remainder of this specification, the description refers to various individual publications identified by a numeric designator contained within a pair of brackets. For example, such a reference may be identified by reciting, "reference [1]" or simply "[1]". A listing of references including the publications corresponding to each designator can be found at the end of the Detailed Description section.

SUMMARY

The present invention is directed toward a system and process for controlling a coding bit rate of streaming media data being transmitted to a client from a server over a computer network. In general, this coding bit rate control involves dynamically adjusting the coding bit rate of the streaming media data to control the client buffer duration. The purpose of this is to prevent the client buffer from underflowing, while keeping the average coding bit rate close to the average transmission bit rate of the network (an thus maximizing the quality of the playback of the data). The problem of coding bit rate control is formulated as a standard problem in linear quadratic optimal control, in which the client buffer duration is controlled as closely as possible to a target level. The smoothness of the average coding bit rate over consecutive frames is also considered when deciding whether to change the coding bit rate as part of the optimal control process. This yields a higher and more stable quality as network conditions change. In addition, the natural variation in the instantaneous coding bit rate that occurs for a given average coding bit rate is explicitly take into consideration. This is accomplished by incorporating the leaky bucket model into the control loop so that the changes in buffer duration due to natural variation in the instantaneous coding bit rate are not mistaken for changes in buffer duration due to network congestion. It is noted that in the present system and process, it is not the actual fullness of the client buffer that is controlled, but an upper bound on the time of arrival of bits into the client buffer, to a target level. The upper bound is based on the leaky bucket model of the coding bit rate.

Preventing the client buffer from underflowing, while keeping the average coding bit rate close to the average transmission bit rate of the network, meets two of the aforementioned user expectations. Namely, if the buffer never underflows, it allows for continuous playback. In addition, keeping the average coding bit rate close to the average transmission bit rate of the network means the data is played back with the highest possible quality given the average communication bandwidth available. This leaves the remaining issue of startup delay. This issue is resolved in the present system and process by controlling the size of the client buffer over time. More particularly, the aforementioned client buffer target level is adjusted to start small, and then grow slowly over time. If the buffer is initially small, it allows for shorter startup delay. In addition, as the buffer is eventually allowed to grow large, it enhances the robustness of the system as well as creating high, nearly constant quality. Thus, client buffer management is a key element affecting the performance of streaming media systems.

More particularly, the present system and process involves a server generating a streaming media data stream that exhibits one of a number of coding bit rates supported by the server. Initially, the server chooses the coding bit rate during a startup period. However, after the startup period, the client provides coding bit rate requests to the server. In response, the server transmits the streaming media data at the most appropriate supported coding bit rate closest to the rate requested by the client. The coding bit rates requested by the client are those estimated to provide a high quality playback of the streaming media data while still keeping a decoder buffer of the client used to receive streaming media data from the server filled to a desired duration level.

The client computes the coding bit rate that will provide the desired results on an ongoing basis using the aforementioned linear quadratic optimal control technique. This coding bit rate computation involves determining on a frame-by-frame basis a coding bit rate that reduces a difference between an estimated latest anticipated arrival time of the frame under consideration and a prescribed target arrival time, while at the same time reducing the change in the coding bit rate to a prescribed degree. In one embodiment involving the aforementioned leaky bucket model, the coding bit rate computations are based on parameters indicative of the state of the encoder buffer of the server. These parameters are computed by the server and provided to the client along with the streaming media data.

More particularly, the server first computes a set of parameters defining an initial state of the encoder buffer as it would exist if a data stream corresponding to a supported coding bit rate where streamed therefrom. A separate set of parameters is computed for each of the supported coding bit rates, and are provided to the client in a preamble to the streaming media data. These parameters include the coding bit rate associated with the data stream, the size of the encoder buffer employed with the coding bit rate of the data stream, and a value indicative of the initial encoder buffer fullness exhibited at the coding bit rate of the data stream. It is noted that the size of the encoder buffer employed with each supported coding bit rate varies and is chosen so as to be the minimum size buffer that will still contain the data stream at any point in the streaming process given the coding bit rate and the initial encoder buffer fullness.

In addition to the initial encoder buffer parameters, the server also computes an upper bound gap for each frame of the streaming media data generated for each coding bit rate supported by the server. This upper bound gap is defined as the number of data bits that the server's encoder buffer can contain over the bits currently contained therein after a just-generated frame is fully input into the buffer. More particularly, the upper bound gap for each frame is computed as the difference between the encoder buffer size and the last computed value for an encoder buffer fullness after insertion of the just-generated frame. The encoder buffer fullness value after insertion of the just-generated frame is computed as the sum of the last computed value of the encoder buffer fullness value prior to insertion of the just-generated frame and the size of that just-generated frame. The encoder buffer fullness value prior to insertion of the just-generated frame is computed as either zero, or the difference between the value computed for the encoder buffer fullness after the insertion of the frame generated immediately before the just-generated frame and the coding bit rate associated with that prior frame divided by the instantaneous frame rate associated with said prior frame, whichever is larger. The instantaneous frame rate is equal to the reciprocal of, the time the next frame is scheduled to be encoded less the time the just-generated frame was encoded. In one embodiment, the server provides the upper bound gap computed for the first frame of a sequence of frames generated after a change in the coding rate to the client along with an indication of the coding bit rate associated with the sequence of frames as part of the data associated with the first frame of the sequence. In another embodiment, the server provides the gap value with every frame generated.

The client employs the encoder buffer parameters and the upper bound gap values to determine on a frame-by-frame basis the coding bit rate that will reduce a difference between the estimated latest anticipated arrival time of a frame under consideration and a prescribed target arrival time of that frame, in order to keep the client buffer at approximately the desired duration level. In cases where the upper bound gap is only provided with the first frame after a change in the coding bit rate, the client estimates the upper bound gap for the frames that do not include a gap value. It is also noted that given the aforementioned initial encoder buffer conditions, it is possible for the client to estimate the upper bound gap values for every frame received. Thus, an alternate embodiment where the server is not configured to compute and provide the gap values on an ongoing basis, the client computer can still compute them on its own.

When a frame with a new average coding bit rate arrives at the client there is a shift in the upper bound gap. This shift can be on the order of seconds and hence, rather than being negligible, can be confusing to the controller. One solution to this is to introduce a simultaneous shift in the control target schedule. To this end, the server also computes a shift value for each frame representing the first frame after a coding bit rate change. This shift value represents the difference between the upper bound gap that would be associated with the frame generated immediately before this first frame had it been encoded at the new coding bit rate and the upper bound gap actually associated with the frame as encoded at the previous coding bit rate. The shift value is provided to the client along with the first frame after a change in the coding bit rate. The client shifts the currently scheduled target arrival time associated with the just received "first" frame by the shift value provided, and the currently scheduled target arrival times for future frames are shifted such that they collectively approach, over a period of time, and eventually coincide with, the previous target arrival times for those frames. In this way the adverse effects of an upper bound gap shift when the coding bit rate is changed are mitigated and the target arrival time values are eventually brought back in line.

In regard to the target arrival time for each frame, these are chosen so as to make the amount of time between the target time of a frame and its playback time large enough, after the startup period, that network jitter, delays and throughput changes which may cause the actual arrival time of the frame to be after its target arrival time do not result in the frame arriving after its scheduled playback time. During the startup period, the target arrival times are chosen so as to make the target arrival time closer to the playback time to assist in reducing startup delay. In one embodiment this is accomplished by setting the target arrival time for each frame using a logarithmic target schedule. In another embodiment this is accomplished by setting the target arrival time for each frame using a two-piece linear target schedule where the difference between the target arrival time and the playback time for a frame arriving during the startup period increases linearly to a prescribed amount of time that is large enough to account for the network jitter, delays and throughput changes and after which the difference remains substantially constant.

It is noted that the startup delay can be further minimized by beginning playback of the first frame of the streaming media data when the client's decoder buffer has the minimum amount of data therein that is needed to ensure an underflow condition does not occur at the initial coding bit rate. Still further, the initial coding bit rate can be set to a level that is less than the anticipated arrival rate of the streaming media data at the client since the minimum amount of data needed to ensure an underflow condition does not occur, decreases as the arrival rate increases relative to the coding bit rate. Thus, in the startup period before the client request changes in the coding bit rate, the server provides the streaming media data at the initial coding bit rate. In one embodiment, the initial coding bit rate is set to approximately one-half the anticipated arrival rate, where the anticipated arrival rate is estimated to be the anticipated transmission rate from the server at the current bandwidth available on the network. It is noted that the startup period can be defined as the period of time prior to the first instance of an estimated latest arrival time of a frame under consideration computed for the initial coding bit rate being earlier than a target arrival time for that frame.

In regard to the client identifying the coding bit rate for each frame that also reduces the change in the coding bit rate to a prescribed degree, it is noted that the prescribed degree can vary depending on whether the coding bit rate increased. If it did increase, then the prescribed degree to which any future change in the coding bit rate is minimized is made greater in comparison to the prescribed degree in cases where the last change in the coding bit rate decreased the rate. Still further, it is also desirable to minimize quality variations due to large or frequent changes to the coding bit rate. In order to stabilize the code bit rate changes, the following actions can be taken. First, in the case where the client identifies a new coding bit rate that represents an increase, a new coding bit rate would be requested from the server only if the new rate does not exceed the current moving average arrival rate of the frames. In another embodiment, the new coding bit rate representing an increase would only be requested from the server, even if it exceeds the current moving average arrival rate of the frames, if the current client buffer duration exceeds the desired duration level by an amount that it is estimated will not be expended at the higher coding bit rate prior to the passing of a prescribed period of time (e.g., 60 seconds). However, in a case where the client identifies a new coding bit rate that represents a decrease, a new coding bit rate would be requested from the server even if it represents a significant departure from the immediately previous coding bit rate. This is because there is little risk in the client buffer underflowing when the coding rate is decreased.

In regard to the aforementioned moving average arrival rate of the frames, a new procedure for computing this rate is employed with the present system and process. More particularly, the moving average arrival rate is computed on a packet-by-packet basis, by calculating the product of the moving average arrival rate computed for the immediately preceding packet to a currently received packet and a fractional weighting factor, added to the product of the instantaneous arrival rate of the currently received packet and one minus the fractional weighting factor. In this computation, the fractional weighting factor is not a constant as in the past, but instead is based on the inter-arrival gaps between received packets. More particularly, the fractional weighting factor $\beta(k)$ for a currently received packet k is computed as $$\frac{e^{-\alpha[t(k)-t(k-1)]} - e^{-\alpha[t(k)-t(0)]}}{1 - e^{-\alpha[t(k)-t(0)]}}$$

where $\alpha$ is the reciprocal of a prescribed time constant, t(k) is the actual arrival time of the current packet, t(k−1) is the actual arrival time of the packet received immediately prior to the current packet, and t(0) is the arrival time of the first packet of the streaming media data. In this case, the instantaneous arrival rate $r_a(k)$ of the current packet k is computed as $$\frac{b(k)}{t_a(k) - t_a(k-1)},$$

where b(k) is the size of the current packet. If b(k) is expressed in bits and $t_a(k)-t_a(k-1)$ is expressed in seconds, then the moving average arrival rate represents the arrival rate of the streaming media data bit bits per second. It is noted that a similar procedure can be employed for any arbitrary units of rate of the streaming media.

As mentioned previously, the server generates data streams that exhibit one of a number of coding bit rates supported by the server, and transmits data streams at the most appropriate supported coding bit rate closest to the rate requested by the client. The number of available coding bit rates will depend on how the data is encoded. For example, if a fine grain scalable coding scheme is used theoretically there could be a large number of rates available (although for practical reasons the number is more likely to be lower, e.g., 50). However, if a coarse grain scalable coding scheme or a multiple bit rate coding scheme is employed, there could be a more limited number of coding bit rates available from the server. Thus, in some cases an optimum coding bit rate identified by the client may not be available from the server. In addition, even if there is a matching coding bit rate available, the upper bound gap may be such that switching to that rate would risk a client buffer underflow. Given this, the present system and process includes techniques for determining the most appropriate coding bit rate, from the available rates, in view of the optimum coding bit rate identified by the client. It is noted that the available rates could be provided to the client from the server in a preamble to the streaming media data. In such a case, the client itself would perform the analysis and request the resulting supported coding bit rate from the server. However, in an alternate embodiment, the client would request the optimum coding bit rate it identified, and the server would perform the analysis to determine which supported rate is most appropriate. The server would then provide a data stream exhibiting the selected coding bit rate. In either case, the analysis involves finding a supported coding bit rate that is equal to, or if none are equal, the closest smaller rate to, the optimum coding bit rate identified by the client. Whenever the supported coding bit rate found is lower than the coding bit rate associated with the last generated frame of the streaming media data, all future frames (or those beginning with a frame specified by the client) are generated at that supported rate. However, when the supported coding bit rate found is higher than the coding bit rate associated with the last generated frame, it is determined if a difference between the upper bound gap associated with the last generated frame had it been encoded at the supported coding bit rate found and the upper bound gap associated with that frame encoded at the current coding bit rate, is less than or equal to a maximum allowable difference value. If the difference is less than the maximum allowable difference value, the affected future frames are generated at the supported rate found. But, if the difference is not less than the maximum allowable difference value, the next lower supported coding bit rate is found and the foregoing actions are repeated to ultimately identify the appropriate rate.

The maximum allowable difference value is computed by the client, and if the server is doing the analysis, the client provides the value along with the request for data at the new coding bit rate. The client chooses the maximum allowable difference value such that the latest anticipated arrival time associated with a frame provided by the server immediately prior to a frame under consideration by the client, had it been coded at the requested coding bit rate, is no more than a prescribed fraction of the way from that frame's target arrival time to its playback deadline (e.g., ⅓ of the way).

In addition to the just described benefits, other advantages of the present invention will become apparent from the detailed description which follows hereinafter when taken in conjunction with the drawing FIG. s which accompany it.

DESCRIPTION OF THE DRAWINGS

The specific features, aspects, and advantages of the present invention will become better understood with regard to the following description, appended claims, and accompanying drawings where:

FIG. 7(a) shows a logarithmic schedule and FIG. 7(b) shows a two-piece linear schedule.

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

I. The Computing Environment

Figure 1:
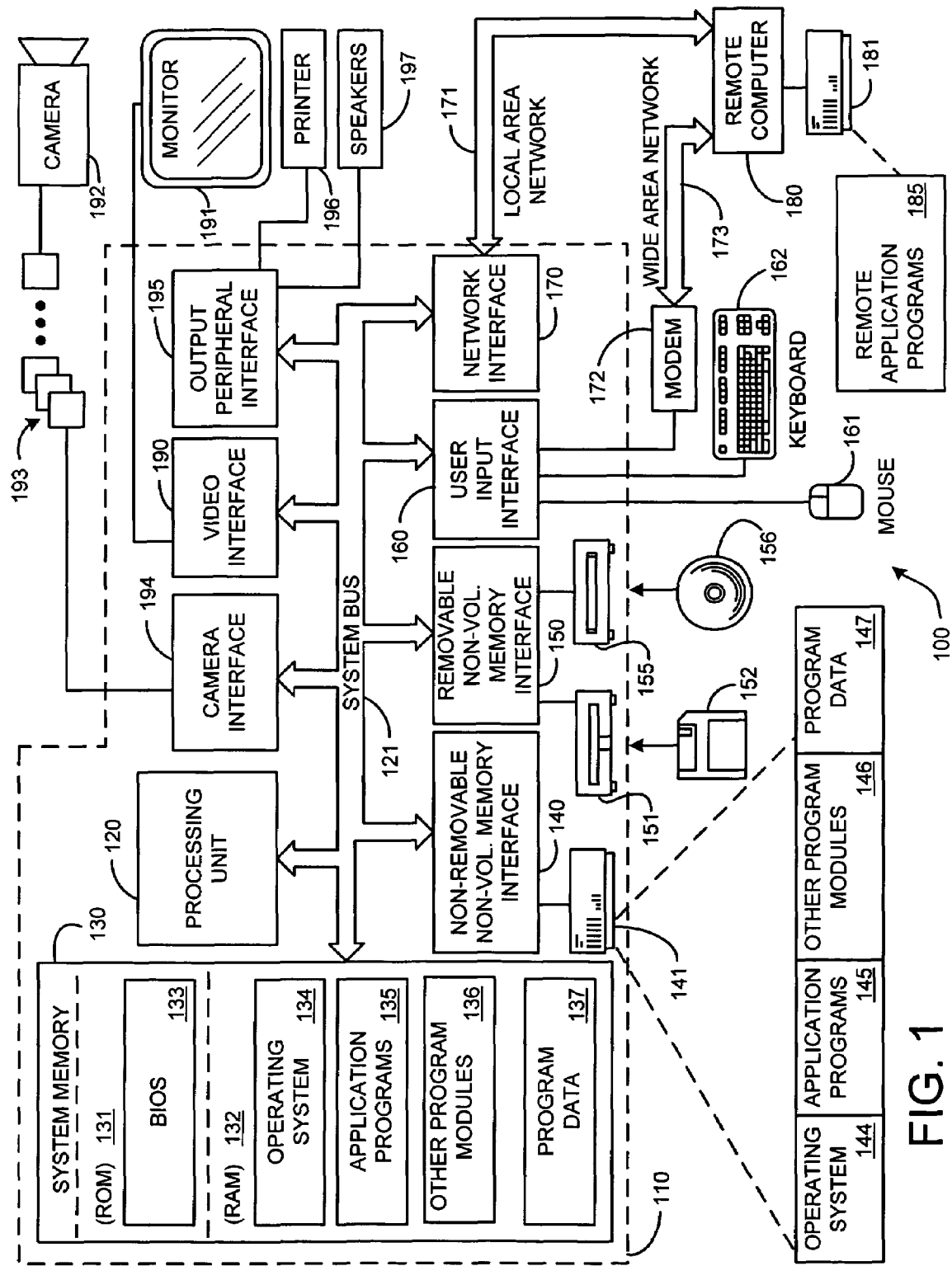
FIG. 1 is a diagram depicting a general purpose computing device constituting an exemplary system for implementing the present invention.

Before providing a description of the preferred embodiments of the present invention, a brief, general description of a suitable computing environment in which portions of the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. A camera 192 (such as a digital/electronic still or video camera, or film/photographic scanner) capable of capturing a sequence of images 193 can also be included as an input device to the personal computer 110. Further, while just one camera is depicted, multiple cameras could be included as input devices to the personal computer 110. The images 193 from the one or more cameras are input into the computer 110 via an appropriate camera interface 194. This interface 194 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

II. Problem Formulation

A. Temporal Coordinate Systems

It will pay to distinguish between the temporal coordinate systems, or clocks, used to express time. Herein, media time refers to the clock running on the device used to capture and timestamp the original content, while client time refers to the clock running on the client used to play back the content. It is assumed that media time is real time (i.e., one second of media time elapses in one second of real time) at the time of media capture, while client time is real time at the time of media playback. The symbol $\tau$ is used to express media time and the symbol t to express client time, with subscripts and other arguments to indicate corresponding events. For example, $\tau_d(0), \tau_d(1), \tau_d(2), \ldots$ is used to express the playback deadlines of frames 0,1,2, ... in media time, while $t_d(0)$, $t_d(1),t_d(2), ...$ is used to express the playback deadlines of frames 0,1,2, ... at the client. Content may be played back at a rate v times real time. Thus the conversion from media time to client time can be expressed as $$t = t_0 + \frac{\tau - \tau_0}{v}, \tag{1}$$

where $t_0$ and $\tau_0$ represent the time of a common initial event, such as the playback of frame 0 (or the playback of the first frame after a seek or rebuffering event) in media and client coordinate systems, respectively.

B. Leaky Bucket Model

Figure 2:
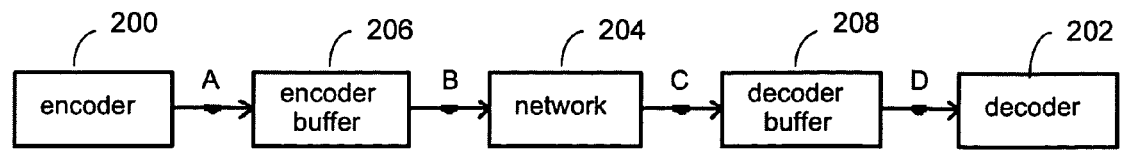
FIG. 2 is block diagram of a simplified streaming media communication pipeline.
Figure 3:
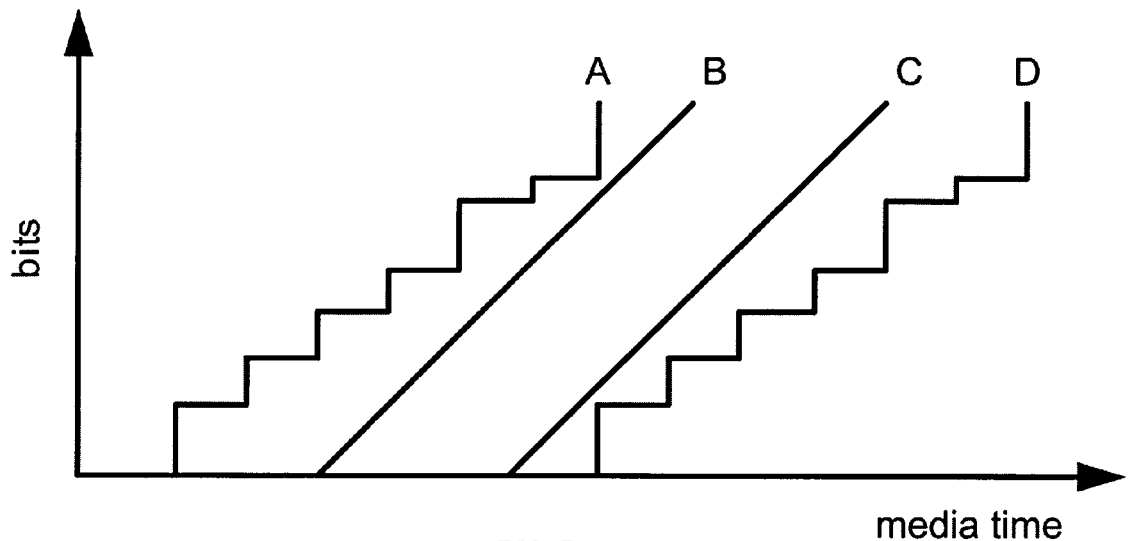
FIG. 3 is a graph showing schedules at which bits in the coded bit stream pass points A, B, C and D in the communication pipeline of FIG. 2 in terms of bits vs. media time.
Figure 4:
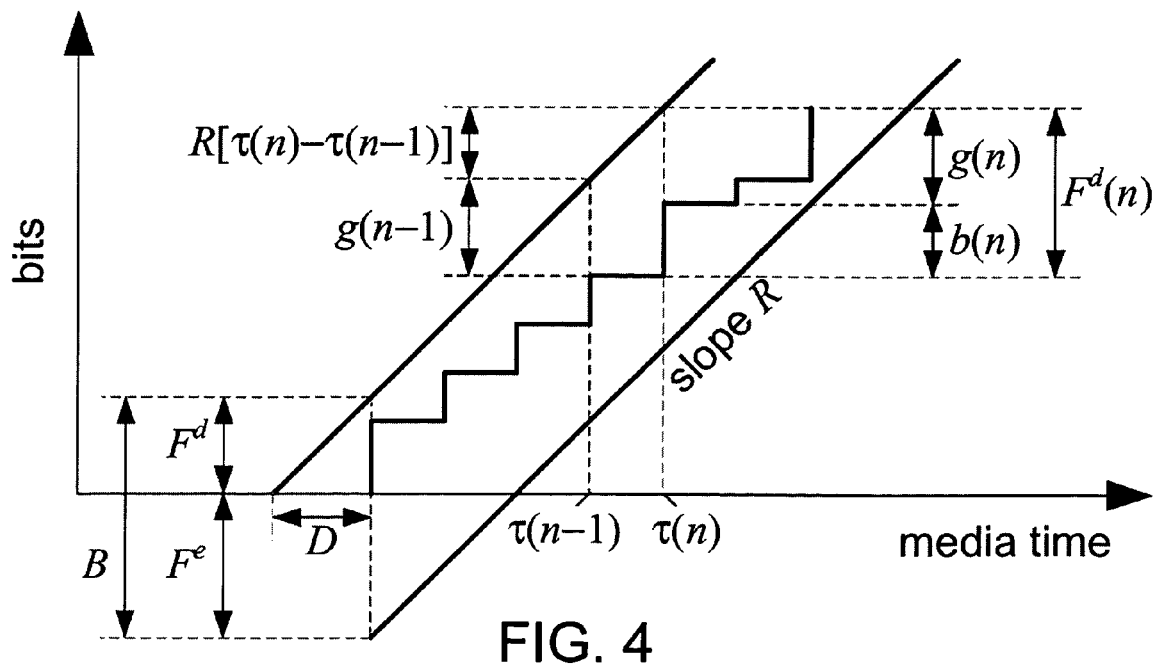
FIG. 4 is a graph showing a buffer tube containing a coding schedule in terms of bits vs. media time.

For the moment imagine a scenario in which both the encoder 200 and the decoder 202 run in real time over an isochronous communication channel of a network 204. In this case, to match the instantaneous coding bit rate to the instantaneous channel rate, an encoder buffer 206 is required between the encoder 200 and the network 204 and a decoder buffer 208 is required between the network 204 and the decoder 202, as illustrated in FIG. 2. A schedule is the sequence of times at which successive bits in the coded bit stream pass a given point in the communication pipeline. The graph in FIG. 3 illustrates the schedules of bits passing the points A, B, C, and D in FIG. 2. Schedule A is the schedule at which captured frames are instantaneously encoded and put into the encoder buffer. This schedule is a staircase in which the $n^{th}$ step rises by $b(n)$ bits at time $\tau(n)$, where $\tau(n)$ is the time at which frame n is encoded, and $b(n)$ is the number of bits in the resulting encoding. Schedules B and C are the schedules at which bits respectively enter and leave the communication channel. The slope of these schedules is R bits per second, where R is the communication rate of the channel. Schedule D is the schedule at which frames are removed from the decoder buffer and instantaneously decoded for presentation. Note that Schedule D is simply a shift of Schedule A. Note also that Schedule B is a lower bound to Schedule A, while Schedule C is an upper bound to Schedule D. Indeed, the gap between Schedules A and B represents, at any point in time, the size in bits of the encoder buffer, while the gap between Schedules C and D likewise represents the size of the decoder buffer. The encoder and decoder buffer sizes are complementary. Thus the coding schedule (either A or D) can be contained within a buffer tube, as illustrated in the graph of FIG. 4, having slope R, height B, and initial offset $F^d$ from the top of the tube (or equivalently initial offset $F^e=B-F^d$ from the bottom of the tube). It can be seen that $D=F^d/R$ is the startup delay between the time that the first bit arrives at the receiver and the first frame is decoded. Thus it is of interest to minimize $F^d$ for a given R.

A leaky bucket is a metaphor for the encoder buffer. The encoder dumps $b(n)$ bits into the leaky bucket at time $\tau(n)$, and the bits leak out at rate R. In general it is possible for the leak rate R to be high enough so that the bucket occasionally empties. Thus the encoder buffer fullness $F^e(n)$ immediately before frame n is added to the bucket and the encoder buffer fullness $B^e(n)$ immediately after frame n is added to the bucket evolve from an initial encoder buffer fullness $F^e(0)=F^e$ according to the dynamical system $$B^e(n) = F^e(n) + b(n), \tag{2}$$

$$F^e(n+1) = \max\{0, B^e(n) - R/f(n)\}, \tag{3}$$

where $$f(n) = \frac{1}{\tau(n+1) - \tau(n)} \tag{4}$$

is the instantaneous frame rate, for n=0,1,2, ... If R is sufficiently low, then the bucket will never run dry (underflow), but if R is too low the bucket will eventually overflow. The largest R such that the buffer will never run dry is taken to be the average coding bit rate $r_c$ of the bit stream. This is made more precise in the following two paragraphs.

A leaky bucket with size B, rate R, and initial fullness $F^e$ is said to contain a stream having a schedule characterized by the steps $\{(b(n),\tau(n))\}$ if $B^e(n) \leq B$ for all n. The minimum bucket size needed to contain the stream given leak rate R and initial fullness $F^e$ is defined as $$B_{min}^e(R, F^e) = \min_n B^e(n), \tag{5}$$

while the corresponding initial decoder buffer fullness is defined as $$F_{min}^d(R,F^e) = B_{min}^e(R,F^e) - F^e. \tag{6}$$

The minimum of each of these over $F^e$ is denoted as $$B_{min}^e(R) = \min_{F^e} B_{min}^e(R, F^e), \tag{7}$$

$$F_{min}^d(R) = \min_{F^e} F_{min}^d(R, F^e). \tag{8}$$

It is shown in [10, Proposition 2] that remarkably; these are each minimized by the same value of $F^e$, which is hence equal to $$F_{min}^e(R) = B_{min}^e(R) - F_{min}^d(R). \tag{9}$$

Thus the bit stream with schedule $\{(b(n),\tau(n))\}$, for each bit rate R there is a unique leaky bucket that contains the stream and that has the minimum buffer size B as well as the minimum startup delay $D=F^d/R$. These parameters can be computed with the above equations.

For sufficiently low leak rates R, the leaky bucket does not underflow, when beginning with initial fullness $F^e=F_{min}^e(R)$. The maximum such rate R may be used as the average coding bit rate $r_c$ of a bit stream with coding schedule $\{(b(n),\tau(n))\}$.

Leak rates R greater than $r_c$ can also be employed. It is shown in [10] that both $B_{min}^e(R)$ and $F_{min}^d(R)$ are decreasing, piecewise linear, and convex in R. Hence if the transmission rate R is greater than the average coding bit rate $r_c$, the startup delay $D=F_{min}^d(R)/R$ can be reduced compared to $D=F_{min}^d(r_c)/R$. This fact will be used in Section IV-A.

A leaky bucket with leak rate $R=r_c$, size $B=B_{min}^e(r_c)$ and initial decoder buffer fullness $F^d=F_{min}^d(r_c)$ thus corresponds to a straight buffer tube bounding the coding schedule as in FIG. 4. Each stream in the media file has a coding schedule; thus each stream corresponds to a straight buffer tube with slope equal to the average coding bit rate $r_c$ of the stream. The size B of the buffer tube and its offset $F^e$ (or $F^d$) relative to the coding schedule can be either computed by the above formula for a variable bit rate (VBR) stream (such as a constant-quality sub-stream of a scalable stream), or obtained from the size B and initial state $F^e$ of the actual encoder buffer used to encode the stream if it is a constant bit rate (CBR) stream.

In the following the gap g(n) at frame n between the buffer tube upper bound and the coding schedule is considered, as depicted in FIG. 4. Note that the decoder buffer fullness $F^d(n)=B-F^e(n)$ can also be expressed $$F^d(n) = b(n) + g(n) = g(n-1) + \frac{r_c(n)}{f(n)}, \quad (10)$$

where $r_c(n)$ is the coding bit rate of the buffer tube, now taking into account that different frames may lie in different buffer tubes with different coding bit rates as coding bit rate control is applied and streams are switched.

C. Rate Control Model

Figure 5:
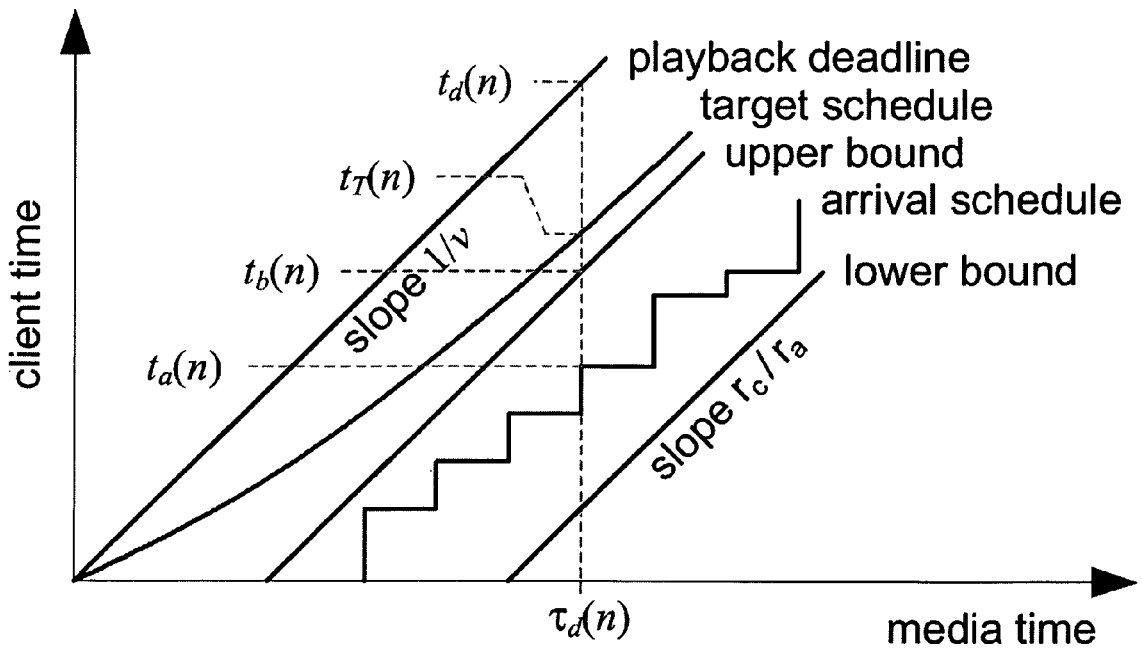
FIG. 5 is a graph showing an arrival schedule and its upper bound in client time vs. media time, where the upper bound is controlled to a target schedule that is increasingly in advance of the playback deadline to provide greater robustness over time.

Assume for the moment that bits arrive at the client at a constant rate $r_a$. Then frame n (having size b(n)) arrives at the client $b(n)/r_a$ seconds after frame n−1. Indeed, the index of a bit is proportional to its arrival time. Dividing the vertical scale of the schedules in FIG. 4 by $r_a$, the schedules are obtained in terms of client time, rather than bits, as shown in the graph of FIG. 5. The coding schedule divided by $r_a$ becomes the arrival schedule, which provides for each n the time $t_a(n)$ of arrival of frame n at the client. The buffer tube upper bound (in bits) divided by $r_a$ becomes the buffer tube upper bound (in time), which provides for each n the time $t_b(n)$ by which frame n is guaranteed to arrive. In the same plot the playback deadline is shown, which is the time $t_d(n)$ at which frame n is scheduled to be played (after instantaneous decoding). Thus the gap between a frame's arrival time and its playback deadline is the client buffer duration at the time of the frame arrival. This must be non-negative to allow continuous playback.

In reality the arrival rate is not constant. If $t_a(n-1)$ and $t_a(n)$ are the arrival times of frames n and n−1 respectively, then $$r_a(n) = \frac{b(n)}{t_a(n) - t_a(n-1)} \quad (11)$$

can be defined as the instantaneous arrival rate at frame n. In practice the average arrival rate at frame n is estimated by a moving average $\tilde{r}_a(n)$ of previous values of $r_a(n)$, as detailed in Section IV-C. Hence using Eq. (11) the arrival time of frame n can be expressed in terms of the arrival time of frame n−1 as $$t_a(n) = t_a(n-1) + \frac{b(n)}{r_a(n)} \quad (12)$$

$$= t_a(n-1) + \frac{b(n)}{\tilde{r}_a(n)} + v(n), \quad (13)$$

where the v(n) term is an error term that captures the effect of using the slowly moving average $\tilde{r}_a(n)$. From Eq. (10), however, it can be seen that $$b(n) = \frac{r_c(n)}{f(n)} + g(n-1) - g(n), \quad (14)$$

whence (substituting Eq. (14) into Eq. (13)) yields $$t_a(n) = t_a(n-1) + \frac{r_c(n)}{f(n)\tilde{r}_a(n)} + \frac{g(n-1)}{\tilde{r}_a(n)} - \frac{g(n)}{\tilde{r}_a(n)} + v(n). \quad (15)$$

Now defining the buffer tube upper bound (in time) of frame n as $$t_b(n) = t_a(n) + \frac{g(n)}{r_a(n)}, \quad (16)$$

so that $$t_b(n) - t_b(n-1) = t_a(n) - t_a(n-1) + \frac{g(n)}{\tilde{r}_a(n)} - \frac{g(n-1)}{\tilde{r}_a(n-1)}, \quad (17)$$

the following update equation is obtained:

$$t_b(n) = t_b(n-1) + \frac{r_c(n)}{f(n)\tilde{r}_a(n)} + w(n-1), \quad (18)$$

where $$w(n-1) = \frac{g(n-1)}{\tilde{r}_a(n)} - \frac{g(n-1)}{\tilde{r}_a(n-1)} + v(n). \quad (19)$$

is again an error term that captures variations around a locally constant arrival rate.

Using Eq. (16), the client can compute $t_b(n-1)$ from the measured arrival time $t_a(n-1)$, the estimated arrival rate $\tilde{r}_a(n-1)$, and g(n−1) (which can be transmitted to the client along with the data in frame n−1 or computed at the client as described in Section V-E). Then using Eq. (18), the client can control the coding bit rate $r_c(n)$ so that $t_b(n)$ reaches a desired value, assuming the frame rate and arrival rate remain roughly constant. From this perspective, Eq. (18) can be regarded as the state transition equation of a feedback control system and it is thus possible to use a control-theoretic approach to regulate the coding bit rate.

D. Control Objective

With the state transition equation defined in Eq. (18), uninterrupted playback can be achieved by regulating the coding bit rate so that the client buffer does not underflow. To introduce a margin of safety that increases over time, a target schedule is introduced, as illustrated in FIG. 5, whose distance from the playback deadline grows slowly over time. By regulating the coding bit rate, it is attempted to control the buffer tube upper bound so that it tracks the target schedule. If the buffer tube upper bound is close to the target schedule, then the arrival times of all frames will certainly be earlier than their playback deadlines and thus uninterrupted playback will be ensured. Note that controlling the actual arrival times (rather than their upper bounds) to the target would result in an approximately constant number of bits per frame, which would in turn result in very poor quality overall. By taking the leaky bucket model into account, it is possible to establish a control that allows the instantaneous coding bit rate to fluctuate naturally according to the encoding complexity of the content, within previously established bounds for a given average coding bit rate.

Although controlling the upper bound to the target schedule is our primary goal, it is also desirable to minimize quality variations due to large or frequent changes to the coding bit rate. This can be achieved by introducing into the cost function a penalty for relative coding bit rate differences.

Letting $t_T(n)$ denote the target for frame n, the following cost function is used to reflect both of concerns:

$$I = \sum_{n=0}^{n}\left((t_b(n) - t_T(n))^2 + \sigma\left(\frac{r_c(n+1) - r_c(n)}{\tilde{r}_a(n)}\right)^2\right), \quad (20)$$

where the first term penalizes the deviation of the buffer tube upper bound from the target schedule and the second term penalizes the relative coding bit rate difference between successive frames. N is the control window size and σ is a Lagrange multiplier or weighting parameter to balance the two terms.

III. Optimal Control Solution

Before presenting the optimal control solution, the design rational of the target schedule will be described.

A. Target Schedule Design

Figure 6:
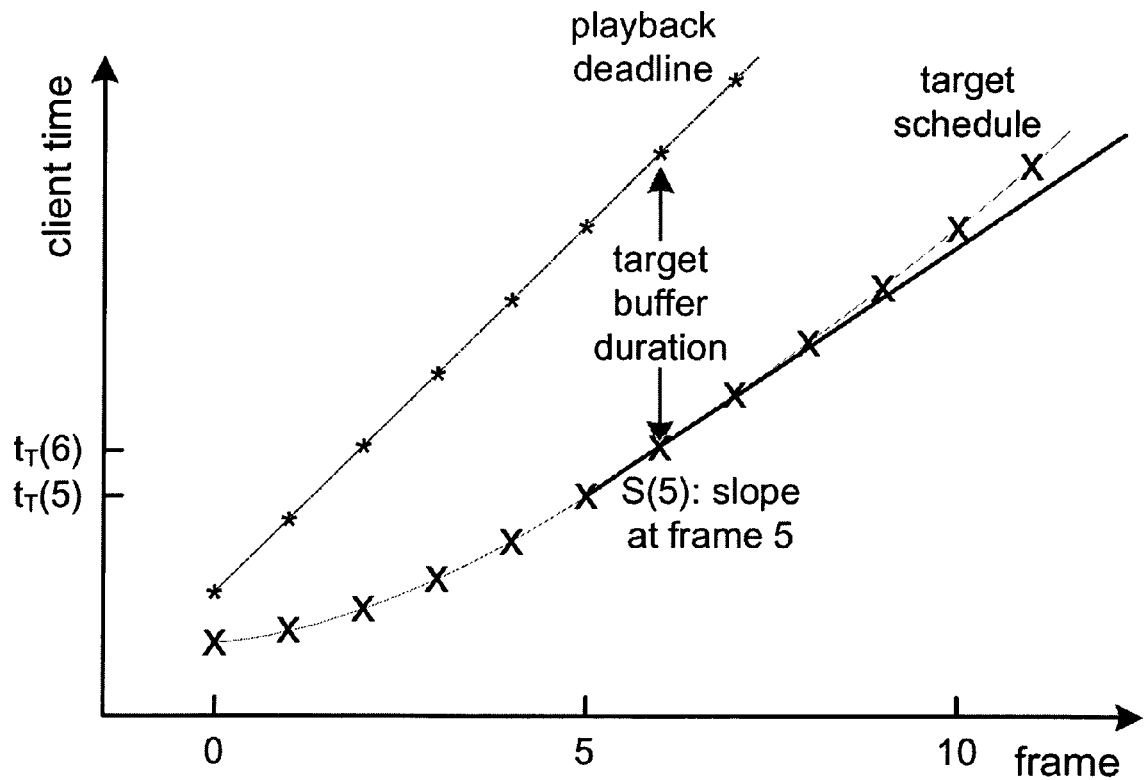
FIG. 6 is a graph showing a target arrival schedule design.

FIG. 6 is a graph showing an illustrative target schedule. The gap between the playback deadline and the target schedule is the desired client buffer duration (in client time). If the gap is small at the beginning of streaming, then it allows a small startup delay, while if the gap grows slowly over time, it gradually increases the receiver's ability to counter jitter, delays, and throughput changes.

The slope of the target schedule relates the average coding bit rate to the average arrival rate. Let $t_T(n)$ be the target for frame n. As illustrated in FIG. 6, the slope of the target schedule at frame n is $$s(n) = \frac{t_T(n+1) - t_T(n)}{\tau(n+1) - \tau(n)}. \quad (21)$$

If the upper bound $t_b(n)$ aligns perfectly with the target schedule (i.e., $t_b(n) = t_T(n)$) and the arrival rate $r_a$ is constant (i.e., the w(n−1) term vanishes), from Eq. (18), $$s(n) = \frac{t_b(n+1) - t_b(n)}{\tau(n+1) - \tau(n)} = \frac{r_c(n)}{r_a}. \quad (22)$$

Thus initially, when the slope was low, i.e., less than 1/v, $r_a/r_c$ is greater than v and more than v seconds of content are received per second of client time, causing the client buffer (which is playing out only v seconds of content per second of client time) to grow. Over time, as the slope approaches 1/v, $r_a/r_c$ approaches v and the buffer remains relatively constant (except for changes due to variations in the instantaneous coding bit rate), since content is received and played back at the same speed v. Next two target schedule functions are presented that illustrate the general design idea.

1) Logarithmic Target Schedule

One way to choose the target schedule $t_T$ is to have the client buffer duration grow logarithmically over time. Specifically, if $t_d$ is the playback deadline, then for each $t_d$ greater than some start time $t_{d0}$, $$t_T = t_d - \frac{b}{a}\ln(a(t_d - t_{d0}) + 1). \quad (23)$$

Since by Eq. (1), $t_d = t_{d0} + (\tau_d - \tau_{d0})/v$, this yields $$s = \frac{dt_T}{d\tau_d} = \frac{dt_T dt_d}{dt_d d\tau_d} = \frac{1}{v} - \frac{b}{a(\tau_d - \tau_{d0}) + v}, \quad (24)$$

and hence the initial slope at frame 0 (when $t_d = t_{d0}$) is $s(0) = (1-b)/v$. Setting b=0.5 implies that initially $r_c/r_a = 0.5/v$, causing the client buffer to grow initially at two times real time. Further setting a=0.15 implies that the client buffer duration will be 7.68 seconds after 1 minute, 15.04 seconds after 10 minutes, and 22.68 seconds after 100 minutes, regardless of v.

2) Two-Piece Linear Target Schedule

Another way to choose the target schedule $t_T$ is to have the client buffer duration grow linearly at rate b seconds of media time per second of client time until the buffer duration reaches a seconds of media time, after which it remains constant. Specifically, for each $t_d$ greater than some start time $t_{d0}$, $$t_T = \begin{cases} t_d - b(t_d - t_{d0}) & t_d \leq t_{d0} + a/b \\ t_d - a & t_d \geq t_{d0} + a/b \end{cases} \quad (25)$$

The initial slope is again $s(0) = (1-b)/v$. Setting b=0.5 implies that initially $r_c/r_a = 0.5/v$, causing the client buffer to grow initially at two times real time. Further setting a=10 implies that the client buffer duration will reach 10 seconds of media time after 20 seconds of client time, regardless of v.

Figure 7A:
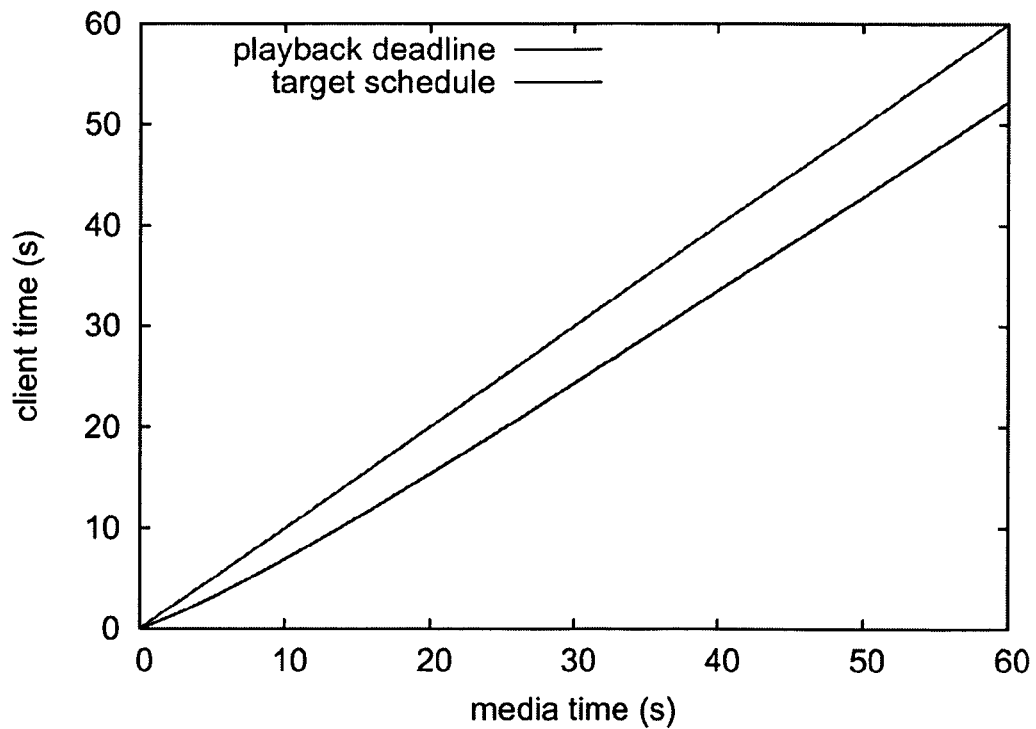
FIGS. 7(a)-(b) are graphs showing two different target arrival schedules.
Figure 7B:
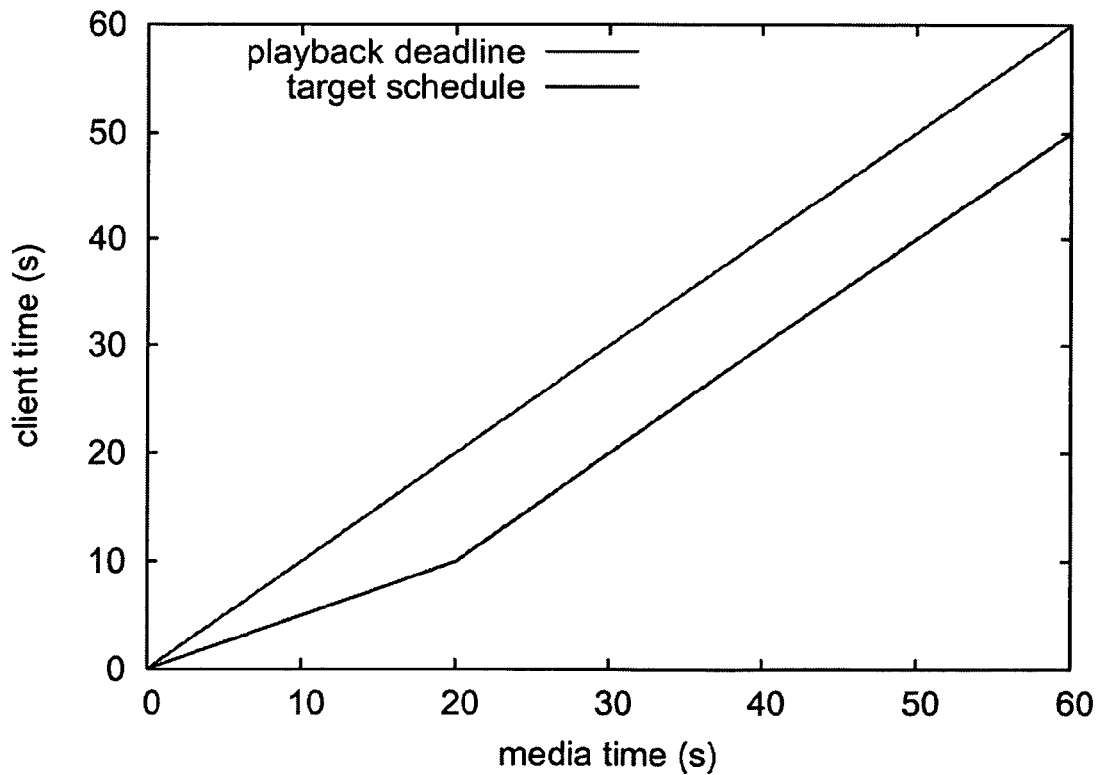

FIGS. 7(a) and (b) show graphs of the above two target schedules. As one can see, if a client buffer duration of 10 seconds is considered to be a safe level against jitter, delay and network fluctuations, then the two-piece linear target schedule reaches the safe level in 20 seconds, much faster than the logarithmic target schedule. On the other hand, the slope of the two-piece linear target schedule remains lower for longer (hence the coding bit rate and quality are lower for longer) and furthermore experiences an abrupt change at 20 seconds when its slope changes from 0.5/v to 1/v. Consequently, the coding bit rate will not change as smoothly as with the logarithmic target schedule, although it will not be as abrupt as the schedule itself because of the smoothness objective in the controller design.

B. Optimal Controller Design

Recall from Eq. (18) the fundamental state transition equation, which describes the evolution of the buffer tube upper bound $t_b(n)$ in terms of the coding bit rate $r_c(n)$:

$$t_b(n+1) = t_b(n) + \frac{r_c(n+1)}{f \tilde{r}_a} + w(n). \quad (26)$$

Here it is now assumed that the frame rate f and the average arrival rate $\tilde{r}_a$ are relatively constant. Deviations from this assumption are captured by w(n).

It is desired to control the upper bound by adjusting the coding bit rate. As each frame arrives at the client, a feedback loop can send a message to the server to adjust the coding bit rate. Note, however, that by the time frame n arrives completely at the client, frame n+1 has already started streaming from the server. Thus the coding bit rate $r_c(n+1)$ for frame n+1 must already be determined by time $t_a(n)$. Indeed, at time $t_a(n)$, frame n+2 is the earliest frame for which the controller can determine the coding bit rate. Hence at time $t_a(n)$, the controller's job must be to choose $r_c(n+2)$. This one-frame delay in the feedback loop must be explicitly accounted for.

For simplicity, the target schedule is linearized around the time that frame n arrives. The linearization is equivalent to using a line tangent to the original target schedule at a particular point as an approximate target schedule. Thus, $$t_T(n+1) - 2t_T(n) + t_T(n-1) = 0. \quad (27)$$

Rather than directly control the evolution of the upper bound, which grows without bound, for the purposes of stability an error space formulation is used. Defining the error as $$e(n) = t_b(n) - t_T(n), \quad (28)$$

results in $$e(n+1) - e(n) = (t_b(n+1) - t_T(n+1)) - (t_b(n) - t_T(n)) \quad (29)$$
$$= (t_b(n+1) - t_b(n)) - (t_T(n+1) - t_T(n)) \quad (30)$$
$$= \frac{r_c(n+1)}{f\tilde{r}_a} - (t_T(n+1) - t_T(n)) + w(n), \quad (31)$$

from which in turn $$(e(n+1) - e(n)) - (e(n) - e(n-1)) = [r_c(n+1) - r_c(n)]/f\tilde{r}_a - \quad (32)$$
$$(t_T(n+1) - 2t_T(n) + t_T(n-1)) + (w(n) - w(n-1))$$
$$= \frac{r_c(n+1) - r_c(n)}{f\tilde{r}_a} + (w(n) - w(n-1)) \quad (33)$$

The control input is then defined as $$u(n) = \frac{r_c(n+2) - \hat{r}_c(n+1)}{\tilde{r}_a}, \quad (34)$$

where $\hat{r}_c(n+1)$ is a possibly quantized version of $r_c(n+1)$ (as defined in Section IV-D) and the disturbance is defined as $$d(n) = \frac{\hat{r}_c(n) - r_c(n)}{f\tilde{r}_a} + w(n) - w(n-1). \quad (35)$$

Then Eq. (33) can be rewritten $$e(n+1) = 2e(n) - e(n-1) + \frac{u(n-1)}{f} + d(n). \quad (36)$$

Therefore, defining the error vector $$e(n) = \begin{bmatrix} e(n) \\ e(n-1) \\ u(n-1) \end{bmatrix} = \begin{bmatrix} t_b(n) \\ t_b(n-1) \\ \frac{r_c(n+1)}{\tilde{r}_a} \end{bmatrix} - \begin{bmatrix} t_T(n) \\ t_T(n-1) \\ \frac{\hat{r}_c(n)}{\tilde{r}_a} \end{bmatrix} \quad (37)$$

the error space representation of the system can be expressed as $$e(n+1) = \begin{bmatrix} 2 & -1 & \frac{1}{f} \\ 1 & 0 & 0 \\ 0 & 0 & 0 \end{bmatrix} e(n) + \begin{bmatrix} 0 \\ 0 \\ 1 \end{bmatrix} u(n) + \begin{bmatrix} 1 \\ 0 \\ 0 \end{bmatrix} d(n), \quad (38)$$

or $e(n+1) = \Phi e(n) + \Gamma u(n) + \Gamma_d d(n)$ for appropriate matrices $\Phi$, $\Gamma$ and $\Gamma_d$.

Assuming the disturbance d(n) is a pure white noise, and assuming perfect state measurement (i.e., all components of e(n) can be measured without using an estimator), the disturbance d(n) does not affect the controller design. Thus a linear controller represented by $$u(n) = -Ge(n) \quad (39)$$

can be used where G is a feedback gain. By the time frame n is completely received, all elements of e(n) are available at the client and u(n) can thus be computed. The ideal coding bit rate for frame n+2 can then be computed as $$r_c(n+2) = \hat{r}_c(n+1) - Ge(n)\tilde{r}_a. \quad (40)$$

Finding the optimal linear controller amounts to finding the feedback gain G* that minimizes the quadratic cost function defined in Section II-D. Before continuing with the design, the system controllability matrix C, $$C = [\Gamma \quad \Phi\Gamma \quad \Phi^2\Gamma] = \begin{bmatrix} 0 & \frac{1}{f} & \frac{2}{f} \\ 0 & 0 & \frac{1}{f} \\ 1 & 0 & 0 \end{bmatrix} \quad (41)$$

will be checked first which has full rank for any frame rate f. Thus, the system is completely controllable and the state e(n)

can be regulated to any desirable value. Now recall that the cost function defined in Section II-D is $$I = \sum_{n=0}^{N} \left\{ (t_b(n) - t_T(n))^2 + \sigma \left( \frac{r_c(n+1) - r_c(n)}{\tilde{r}_a} \right)^2 \right\} \quad (42)$$

$$= \sum_{n=0}^{N} \{e(n)^T Q e(n) + u(n-1)^T R u(n-1)\}, \quad (43)$$

where $Q=C^TC$ (with $C=[1\ 0\ 0]$) and $R=\sigma$. Then, the original control problem of tracking the target schedule while smoothing the coding bit rate fluctuations (i.e., minimizing the cost function I) is converted to a standard regulator problem in the error space. Letting $N \to \infty$, the infinite horizon optimal control problem can be solved by applying the results in [11, Section 3.3] to obtain an optimal regulator in two steps: 1) solving, to get S, the discrete algebraic Riccati equation (DARE)

$$S = \Phi^T \{S - S\Gamma/\Gamma^T S\Gamma + R\}^{-1} \Gamma^T S\} \Phi + Q, \quad (44)$$

and 2) computing the optimal feedback gain $$G^* = [\Gamma^T S\Gamma + R]^{-1} \Gamma^T S\Phi. \quad (45)$$

The existence and uniqueness of S (and in turn of G*) is guaranteed when Q is nonnegative definite and R is positive definite, which is straightforward to verify in this case.

C. Frame Rate

In the previous section, it was assumed that the frame rate is constant. This assumption is reasonable when streaming a single medium, such as video without audio. Variable frame rate video is usually achieved by skipping frames, which can be accommodated by setting b(n)=0. However, usually video and audio are streamed together, and their merged coding schedule may have no fixed frame rate. Even if there is a fixed frame rate f, it may be desirable to operate the controller at a rate lower than f, to reduce the feedback rate, for example.

To address these issues, in practice the notion of a virtual frame rate is used. A virtual frame rate f is chosen, for example f=1 frame per second (fps); media time is partitioned into intervals of size 1/f; and all of the (audio and video) frames arriving within each interval are modeled as a virtual frame whose decoding and playback deadline is the end of the interval.

This approach has several advantages. First, it allows offline design of a universal feedback gain, which is independent of the actual frame rate of the stream or streams. Second, it allows the rate of feedback from the client to the server to be reduced. And finally, since the interval between virtual frames is typically safely larger than a round trip time (RTT), a one-frame delay in the error space model (as described in the previous section) is sufficient to model the feedback delay. Otherwise it would be necessary to model the feedback delay with approximately RTT/f additional state variables to represent the network delay using a shift register of length RTT/f.

In the remainder of this description a virtual frame rate f=1 fps is employed, and is referred to simply as the frame rate. Likewise, a virtual frame is referred to simply as a frame.

It is noted that with the present controller design rationale, the deviation of the buffer tube upper bound from the control target can be reduced by decreasing the $\sigma$ value. A smaller value of $\sigma$ value implies a relative larger penalty on the deviation term in the cost function and thus forces the upper bound to track the target more closely. This, however, happens at the cost of sacrificing coding bit rate smoothness, since the corresponding term in the cost function will be weighted less. It has been found with $\sigma=500$ that while the buffer tube upper bound deviates only slightly from the control target, the coding bit rate has undesirable oscillations. On the other hand, a large $\sigma$ value will certainly yield smoother coding bit rates, but might also incur client buffer underflow since the buffer tube upper bound is allowed to deviate significantly away from the control target. Therefore, a good choice of $\sigma$ should take into account this trade-off. In tested embodiments of the present system and process, $\sigma=4000$ was chosen when the coding bit rate switches up and $\sigma=2000$ when it switches down. Note that a slightly more aggressive strategy is allowed in the latter case to further reduce the chance of client buffer underflow.

IV. Practical Issues with Streaming

A. Fast Startup

As discussed in previous sections, the startup delay is the length of the period from the time that content first begins to arrive at the client to the time that playback begins. During this period, content accumulates in the receiver buffer to counter packet jitter, retransmission delay, variations in network bandwidth, and variations in instantaneous coding bit rate. It is conceivable that a longer startup delay would increase the chances of being able to maintain continuous playback in a dynamic network environment. On the other hand, users expect the startup delay to be as small as possible. Thus, it is desirable to investigate techniques that can reduce the startup delay while retaining robustness. One possible approach is to transmit the content at a faster than normal rate at the beginning of streaming. This bursting technique will certainly build up the buffer duration in a small amount of time. It, however, puts extra pressure on the network by demanding a higher than normal initial bandwidth, which may not even be available.

The present system and process employs an alternative fast startup technique, which takes advantage of the properties of adaptive media. As discussed in previous sections, by choosing an initial coding bit rate $r_c$ equal to half the arrival rate $r_a$ (divided if necessary by the playback speed v), the client buffer duration can grow at two times real time during playback. Growing the client buffer during playback enables the startup delay to be low, because playback can begin while the buffer duration is still low. Beginning playback while the buffer duration is low is not particularly risky over the short term, because the probability of deep congestion occurring in any short interval is low. However, the probability of deep congestion occurring in a long interval is high, so it is important for the buffer duration to be high over the long term. Without the ability to grow the buffer duration during playback, startup would have to be delayed until the buffer duration was sufficiently high to guarantee continuous playback over the long term.

Moreover, if the transmission rate is twice the coding bit rate, the startup delay can be further reduced by taking advantage of properties of the leaky bucket model [10]. As detailed in Section II-B, the startup delay for a given bit stream is $D=F_{min}^d(R)/R$ when the stream is transmitted at rate R. This is ordinarily equal to $F_{min}^d(r_c)/r_c$ when transmitting the stream at its coding bit rate. However, when transmitting the stream at a rate $r_a > r_c$ ($r_c = 0.5\ r_a/v$), then the startup delay drops to $F_{min}^d(r_a)/r_a$. Thus the startup delay D decreases both because the numerator decreases and because the denominator increases.

Figure 8:
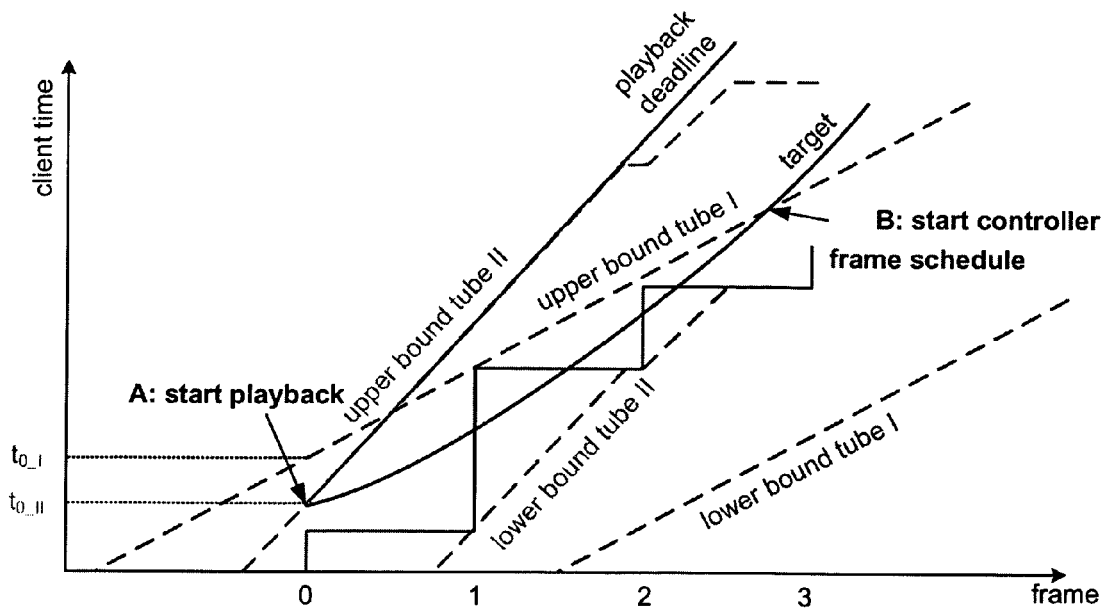
FIG. 8 is a graph showing buffer tubes for various transmission rates.

The graph in FIG. 8 illustrates the decrease in the initial decoder buffer fullness $F_{min}^d(R)$ as R changes from $r_c$ to $r_a$. In particular, it depicts the coding schedule for a given bit stream, as well as upper and lower bounds, denoted Tube I and Tube II, corresponding to two leaky buckets with leak rates $r_c$ and $r_a$ respectively, both containing the coding schedule. Tube II is smaller than Tube I, since the minimum size $B_{min}(R)$ of a leaky bucket containing a given stream is decreasing in the leak rate R [10]. Likewise, the initial decoder buffer fullness $F_{min}(R)$ is decreasing in R [10]. Hence the playback deadline for frame 0 can begin as early as client time $t_{0\_1I} = F_{min}^d(r_a)/r_a$, instead of $t_{0\_1} = F_{min}^d(r_c)/r_a$. From there, the playback deadline advances at 1/v seconds of client time per second of media time.

B. Controller Initialization

As illustrated in FIG. 8, the target schedule starts at the same time as the playback deadline and grows according to a predefined function. The controller attempts to control the upper bound of Tube I to the target schedule. Initially the upper bound of Tube I is above the target schedule (and is indeed above the playback deadline, though it is known that this is safe). Hence, when the playback starts, the controller would try to close the gap by decreasing the coding bit rate. This, however, would not be desirable because the current coding bit rate is already lower than the arrival rate to allow the client buffer to grow. Further reduction of the coding bit rate would not be proper. To avoid this effect, the controller is initialized when the upper bound of Tube I exceeds the target schedule i.e., at point B in FIG. 8. Point B can be found analytically, but in practice there is no need to explicitly solve for it. The controller can be initialized as soon as the upper bound of Tube I exceeds the target.

C. Exponential Averaging of the Arrival Rate

Using the average arrival rate (instead of the instantaneous arrival rate) helps to reduce coding bit rate oscillations. This section details a new exponential averaging algorithm for the arrival rate.

Let $\tilde{r}_a(k)$ and $r(k)$ be the average arrival rate and the instantaneous arrival rate, respectively, when packet k is received. Note that unlike the controlling operation, the rate averaging operation may be performed after the arrival of every packet, rather than after the arrival of every frame. Hence the discrete packet index k is used rather than the frame index n. Instead of using the widely adopted exponentially weighted moving average (EWMA)

$$\tilde{r}_a(k) = \beta(k)\tilde{r}_a(k-1) + (1-\beta(k))r_a(k) \quad (46)$$

with constant $\beta(k) = \beta$, the exponential averaging is performed more carefully. In the present algorithm, the factor $\beta(k)$ is not constant, but varies according to the packets' inter-arrival gaps. This new algorithm has several advantages over the EWMA algorithm with constant $\beta(k)$. First, the estimate of the average arrival rate $\tilde{r}_a(k)$ goes to zero naturally as the gap since the last packet goes to infinity, rather than being bounded below $\beta\tilde{r}_a(k-1)$. Second, the estimate of the average arrival rate $\tilde{r}_a(k)$ does not go to infinity as the gap since the last packet goes to zero. This is especially important, since packets often arrive in bursts, causing extremely high instantaneous arrival rates. And finally, the estimate of the average arrival rate $\tilde{r}_a(k)$ does not over-weight the initial condition, as if it represented the infinite past. This is especially important in the early stages of estimation.

Figure 9:
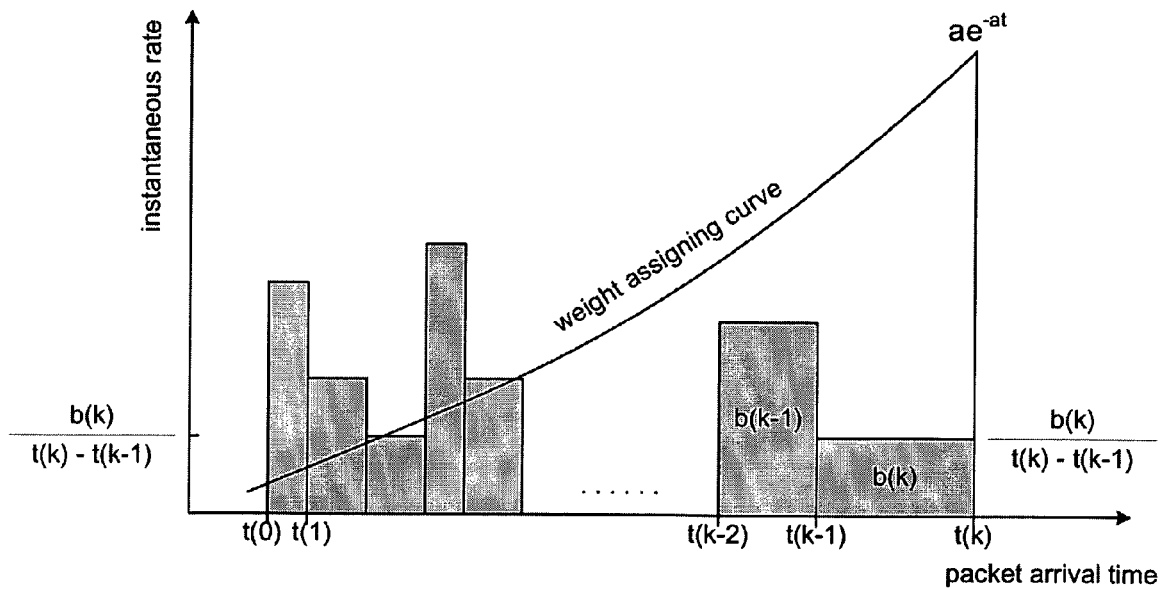
FIG. 9 is a graph illustrating exponential averaging.

As in Eq. (11), the instantaneous arrival rate after packet k is defined as $$r_a(k) = \frac{b(k)}{t_a(k) - t_a(k-1)}, \quad (47)$$

where here b(k) denotes the size of packet k and $t_a(k)$ denotes the arrival time of packet k. The discrete time function $r_a(k)$ is extended to the piecewise constant continuous time function $r_a(t)$ by $$r_a(t) = r_a(k) \text{ for all } t \in (t_a(k-1), t_a(k)), \quad (48)$$

as illustrated in the graph in FIG. 9. Then the function $r_a(t)$ is filtered by the exponential impulse response $\alpha e^{-\alpha t}$, $t \geq 0$, for some time constant $1/\alpha$:

$$\tilde{r}_a(k) = \frac{\int_{t(0)}^{t(k)} r_a(t')\alpha e^{-\alpha(t(k)-t')} dt'}{\int_{t(0)}^{t(k)} \alpha e^{-\alpha(t(k)-t')} dt'}. \quad (49)$$

(Here and in the remainder of this sub-section the subscript is suppressed from the arrival time $t_a(k)$.) Note that $\int_t^\infty \alpha e^{-\alpha t'} dt' = e^{-\alpha t}$, the denominator integral can be expressed as $1 - e^{-\alpha(t(k)-t(0))}$. Now, the range of the numerator integral is split into ranges (t(0), t(k-1)] and (t(k-1), t(k)] to obtain a recursive expression for $\tilde{r}_a(k)$ in terms of $\tilde{r}_a(k-1)$ and $r_a(k)$, $$\tilde{r}_a(k) = \frac{1 - e^{-\alpha[t(k-1)-t(0)]}}{1 - e^{-\alpha[t(k)-t(0)]}} e^{-\alpha[t(k)-t(k-1)]} \tilde{r}_a(k-1) + \quad (50)$$

$$\frac{1 - e^{-\alpha[t(k)-t(k-1)]}}{1 - e^{-\alpha[t(k)-t(0)]}} r_a(k)$$

$$\beta(k)\tilde{r}_a(k-1) + (1 - \beta(k))r_a(k), \quad (51)$$

where $$\beta(k) = \frac{e^{-\alpha[t(k)-t(k-1)]} - e^{-\alpha[t(k)-t(0)]}}{1 - e^{-\alpha[t(k)-t(0)]}}. \quad (52)$$

Note that $\beta(k)$ is numerically stable as k goes to infinity. However, as the gap $\delta = t(k) - t(k-1)$ goes to zero, $1 - \beta(k)$ goes to zero while $r_a(k)$ goes to infinity. Their product, however, is well behaved. Indeed, $$\tilde{r}_a(k) = \frac{1 - e^{-\alpha[t(k-1)-t(0)]}}{1 - e^{-\alpha[\delta+t(k-1)-t(0)]}} e^{-\alpha\delta} \tilde{r}_a(k-1) + \quad (53)$$

$$\frac{1 - e^{-\alpha\delta}}{1 - e^{-\alpha[t(k)-t(0)]}} \frac{b(k)}{\delta}$$

$$\rightarrow \tilde{r}_a(k-1) + \frac{\alpha b(k)}{1 - e^{-\alpha[t(k)-t(0)]}} \quad (54)$$

as $\delta \to 0$, using l'Hôpital's rule. Thus Eq. (54) is the update rule in the case when $t(k) = t(k-1)$.

D. Choosing a Stream Given a Coding Bit Rate

When the client requests a coding bit rate $r_c(n)$, the server complies by choosing a stream (or sub-stream of a scalable stream) having coding bit rate $\hat{r}_c(n)$ approximately equal to $r_c(n)$. There are several reasons that $\hat{r}_c(n)$ may differ from $r_c(n)$. The first reason is that there are only a finite number of streams (or sub-streams) in the media file, even if fine grain scalable coding is used. Thus there may be no stream in the media file with average coding bit rate exactly equal to $r_c(n)$. The second reason is that, even if there is a stream in the media file with average coding bit rate exactly equal to $r_c(n)$, the buffer tube for the stream may be too large to allow switching to the stream without risk of client buffer underflow. In fact, whenever the stream switches, there is generally a discontinuity in the upper bound, which may be either positive or negative. A positive shift in the upper bound is illustrated in the graph in FIG. 10, which, if large, could cause the client buffer to underflow either immediately or eventually.

Figure 10:
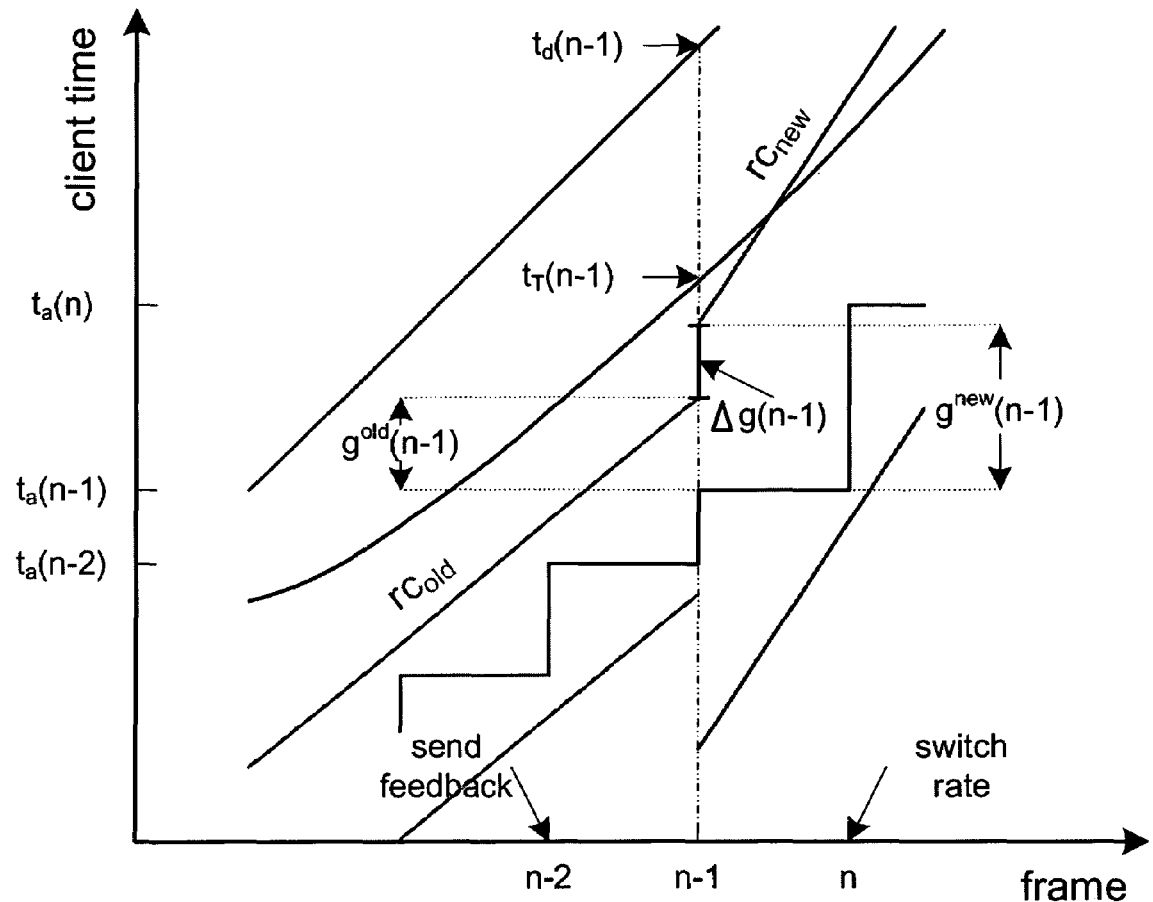
FIG. 10 is a graph showing buffer tube changes and control target adjustments.

Thus the server must choose a stream that causes the upper bound to shift up no more than some amount $\Delta^{max}g(n-1)$ supplied to it by the client. The client supplies $\Delta^{max}g(n-1)$ to the server in its feedback along with $r_c(n)$, shortly after client time $t_a(n-2)$ (after frame n-1 has already begun streaming). Upon receiving the feedback, the server selects a stream with coding bit rate $\hat{r}_c(n)$ as high as possible such that $\hat{r}_c(n) \leq r_c(n)$ and, if $\hat{r}_c(n) > \hat{r}_c(n-1)$ (i.e., if it is a switch up in rate), then $g^{new}(n-1) - g^{old}(n-1) \leq \Delta^{max}g(n-1)$, where $g^{new}(n-1)$ and $g^{old}(n-1)$ are illustrated in FIG. 10. The constraint given by $\Delta^{max}g(n-1)$ is not applied if it is a switch down in rate.

The client chooses $\Delta^{max}g(n-1)$ to limit (its prediction of) what the upper bound would be at time $t_a(n-1)$ if the new coding bit rate were in effect, namely, $$t_b^{new}(n-1) \approx \frac{t_b(n-2) + \hat{r}_c(n-1)}{f\tilde{r}_a} + \frac{\Delta g(n-1)}{\tilde{r}_a} \tag{55}$$

$$\leq t_T(n-1) + p[t_d(n-1) - t_T(n-1)]. \tag{56}$$

That is, the client chooses $\Delta^{max}g(n-1)$ to limit $t_b^{new}(n-1)$ so that it would be no more than fraction p of the way from the target $t_T(n-1)$ to the playback deadline $t_d(n-1)$. In tested embodiments of the present system and process, p=⅓ was chosen.

It is noted that in an alternate embodiment, the information as to what coding bit rates the server supports can be provided to the client ahead of time and the client can be responsible for performing the foregoing analysis. In this case, the client would only request coding bit rates that are supported by the server, and there would be no need to provide the $\Delta^{max}g(n-1)$ to the server with the request.

E. Control Target Adjustment

When a frame with a new average coding bit rate $\hat{r}_c(n)$ arrives at the client at time $t_a(n)$, there is a shift in the upper bound. This shift can be on the order of seconds and hence, rather than being negligible, can be confusing to the controller. If the shift is upward, for example, the controller will immediately try to reduce the coding bit rate $r_c(n+2)$. If the shift is downward, on the other hand, the controller will immediately try to increase the coding bit rate $r_c(n+2)$. Either way is probably not good; the intention is that $\hat{r}_c(n)$ will be maintained unless there is a disturbance in the arrival rate. One solution is to introduce a simultaneous shift in the control target schedule equal to $\Delta g(n-1)/\tilde{r}_a$, where $\Delta g(n-1) = g^{new}(n-1) - g^{old}(n-1)$ is the actual shift in the upper bound (in bits) at frame n-1 computed at the server, as illustrated in FIG. 10.

The server can send this value to the client along with frame n. If there is no stream change, this value is simply zero.

If the control target schedule is adjusted whenever the coding bit rate changes, it will no longer follow the designed target schedule. The adjusted target schedule will be referred to as the control target schedule to distinguish it from the designed target schedule (or simply the target schedule).

The control target schedule, of course, should have a tendency to approach the designed target schedule. The basic idea is to decrease the slope of the control target schedule when it is above the designed target schedule and to increase the slope when it is below.

For the logarithmic target schedule $$t_T = t_d - \frac{b}{a}\ln(at_d + 1)$$

(where $t_d = t_{d0} + (\tau_d - \tau_{d0})/v$), according to Eq. (24) the slope at media time $\tau_d$ is $$s = \frac{dt_T}{d\tau_d} = \frac{1}{v} - \frac{b}{a(\tau_d - \tau_{d0}) + v}. \tag{57}$$

If d is defined as the distance between the playback deadline and the target schedule, namely $$d = \frac{b}{a}\ln\left(a\left(\frac{\tau_d - \tau_{d0}}{v}\right) + 1\right), \tag{58}$$

then the slope may be expressed as a function of d $$s = \frac{1}{v} - \frac{b}{ve^{(a/b)d}}. \tag{59}$$

Hence whenever d is the distance between the playback deadline and the control target, the slope of the control target is set to s in Eq. (59). Specifically, if $t_{\tilde{T}}(n)$ is the control target at frame n after the shift, then $t_{\tilde{T}}(n-1)$ is reset to be $t_{\tilde{T}}(n) - s/f$. Then $t_{\tilde{T}}(n)$ and $t_{\tilde{T}}(n-1)$ is used in place of $t_T(n)$ and $t_T(n-1)$ to compute the error vector e(n) in Eq. (37). The resulting error vector is then used to compute the ideal coding bit rate in Eq. (40).

For the two-piece linear target schedule, the slope is easy to compute by using a predefined time period over which the control target schedule is expected to return to the target schedule. The slope of the control target schedule can then be computed from the distance d and the period. In tested embodiments of the present system and process the period was set to 50 seconds.

V. Implementation Details

This section highlights implementation details on both the sender and the receiver side.

A. Generation of Virtual Streams

In tested embodiments of the present a system and process, a fine grained scalable (FGS) stream comprises a set of data units, each tagged by a Lagrange multiplier λ representing the per-bit decrease in distortion if the data unit is received by the client. If the λ for the data unit is above a threshold, then the data unit is included in a virtual stream corresponding to that threshold. Each threshold corresponds to an overall number of bits and hence an average coding bit rate for the virtual stream. In tested embodiments, N=50 virtual streams are generated. A threshold is chosen for each stream such that the resulting streams have coding bit rates that are uniformly spaced in the log domain between lower and upper bounds.

During streaming, when the server reads a data unit from the media file, it includes the data unit in the virtual stream currently being transmitted if its Lagrange multiplier λ is above the threshold for the stream.

B. Leaky Bucket Computations at the Sender

For each virtual stream, leaky bucket parameters $(R, B_{min}(R), F_{min}^d(R))$ are pre-computed offline for $R=R_{avg}$ and $R=R_{max}$, where $R_{avg}=r_c$ is the average coding bit rate of the stream, and $R_{max}=2r_c$. These leaky bucket parameters are sent to the client in a preamble.

In addition, during streaming the server performs on-line leaky bucket simulations for each stream. Specifically, whenever the server reads a data unit from the media file, it determines the virtual streams to which the data unit belongs, using the Lagrange multiplier of the data unit and the list of thresholds for each stream. The sender then updates, for the determined streams, the states of those leaky buckets having leak rates equal to an average coding bit rate $R_{avg}$, using Eqs. (2) and (3). Once all the data units in a frame are read from the media file, the sender computes $g(n)=B_{min}(R_{avg})-B^e(n)$ for each of the virtual streams. On a stream switch (i.e., $\hat{r}_c(n) \neq \hat{r}_c(n-1)$), the gap $g^{new}(n)$ for the new stream is transmitted to the client along with $\Delta g(n-1)=g^{new}(n-1)-g^{old}(n-1)$ as described below. It is easy to see that the cost of updating the leaky bucket states is quite low. However, it is also possible to pre-compute these values and store them with each data unit in the media file.

C. Initial Coding Bit Rate Selection

At the beginning of a streaming session, the sender needs to have some knowledge of the available network bandwidth so that it can choose an initial coding bit rate (usually half of the bandwidth). The bandwidth estimate can be drawn from proactive measurements, using approaches such as packet pair [12], path chirp [3], etc., or reactive approximations based on history values. The exact form of the initial bandwidth estimation is beyond the scope of this work.

D. Coding Bit Rate Switching

The rate control feedback from the client contains the frame number at which feedback is generated (e.g., n−2 in the previous section) and the maximum allowable shift of the upper bound in bits (e.g., $\Delta^{max}g(n-1)$ in the previous section). If the sender finds a suitable coding bit rate and makes a switch at frame n, it will transmit three values to the client along with the frame: the new coding bit rate $\hat{r}_c^{new}(n)$, the current gap to the upper bound $g^{new}(n)$, and the shift $\Delta g(n-1)=g^{new}(n-1)-g^{old}(n-1)$. With this information, the client can properly adjust its control target schedule as well as its upper bound. Note that coding bit rate switching always happens at the beginning of a new frame, never inside a frame.

E. Optimal Rate Control at the Client

Whenever a new coding bit rate starts, the client receives the value g(n) along with the new frame. The values of g(n) for successive frames can be then inferred by the client itself based on the coding bit rate $\hat{r}_c(n)$ and the frame size b(n). The client records the arrival frame time $t_a(n)$, calculates the buffer tube upper bound $t_b(n)$ and then computes the deviation e(n). If there is a coding bit rate switch, it will also compute the buffer tube shift and adjust the control target schedule accordingly. Then, e(n) is fed to the optimal rate controller, which outputs a desired new coding bit rate. The latest new coding bit rate is fed back to the sender whenever there is a feedback opportunity, which could be generated at regular intervals or on-demand.

F. Exemplary Process

An exemplary process for the implementation of the foregoing system will now be provided as applicable to one embodiment of the present invention.

Figure 11A:
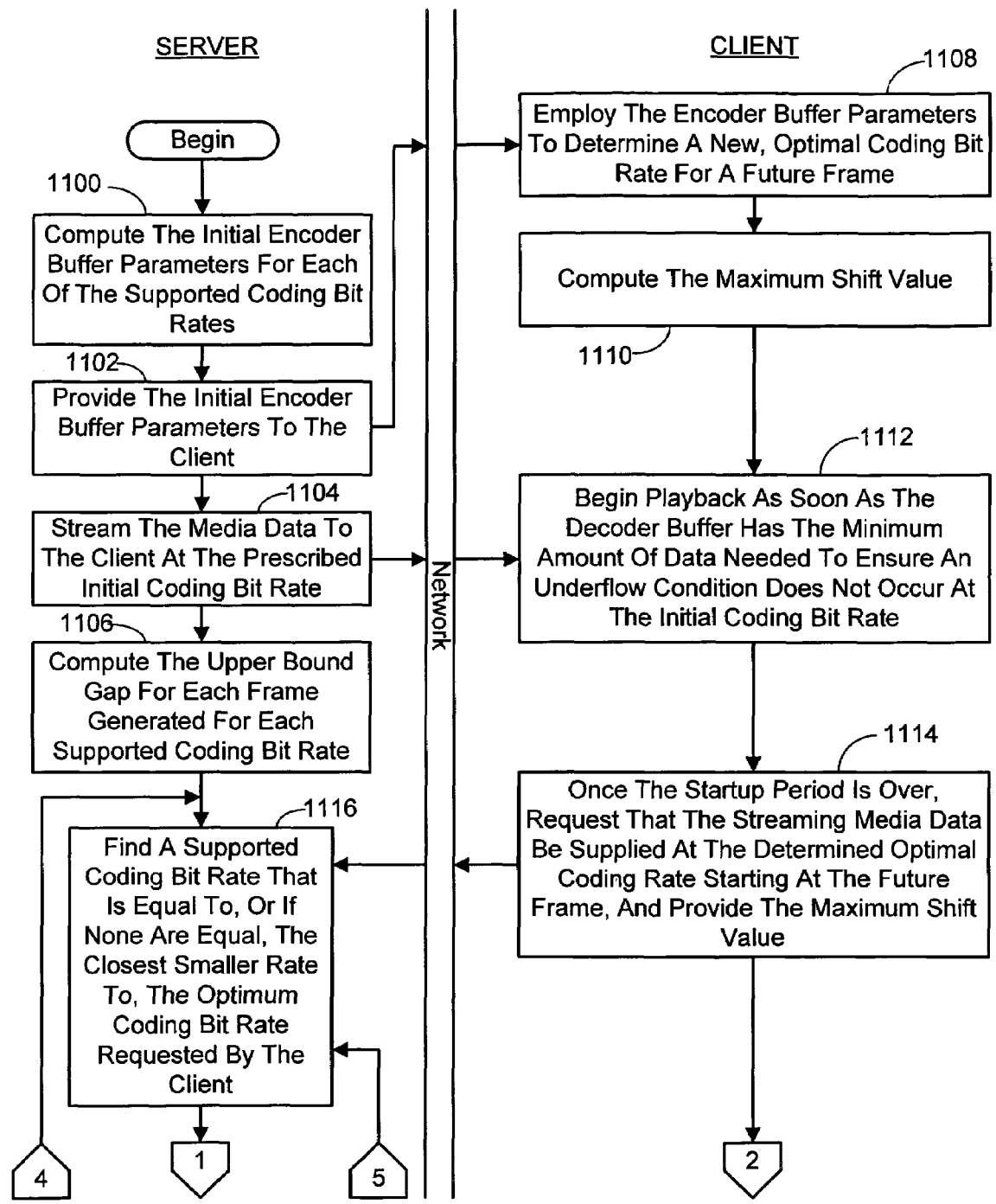
FIGS. 11A-C show a flow chart diagramming an embodiment of the coding bit rate control process according to the present invention.
Figure 11B:
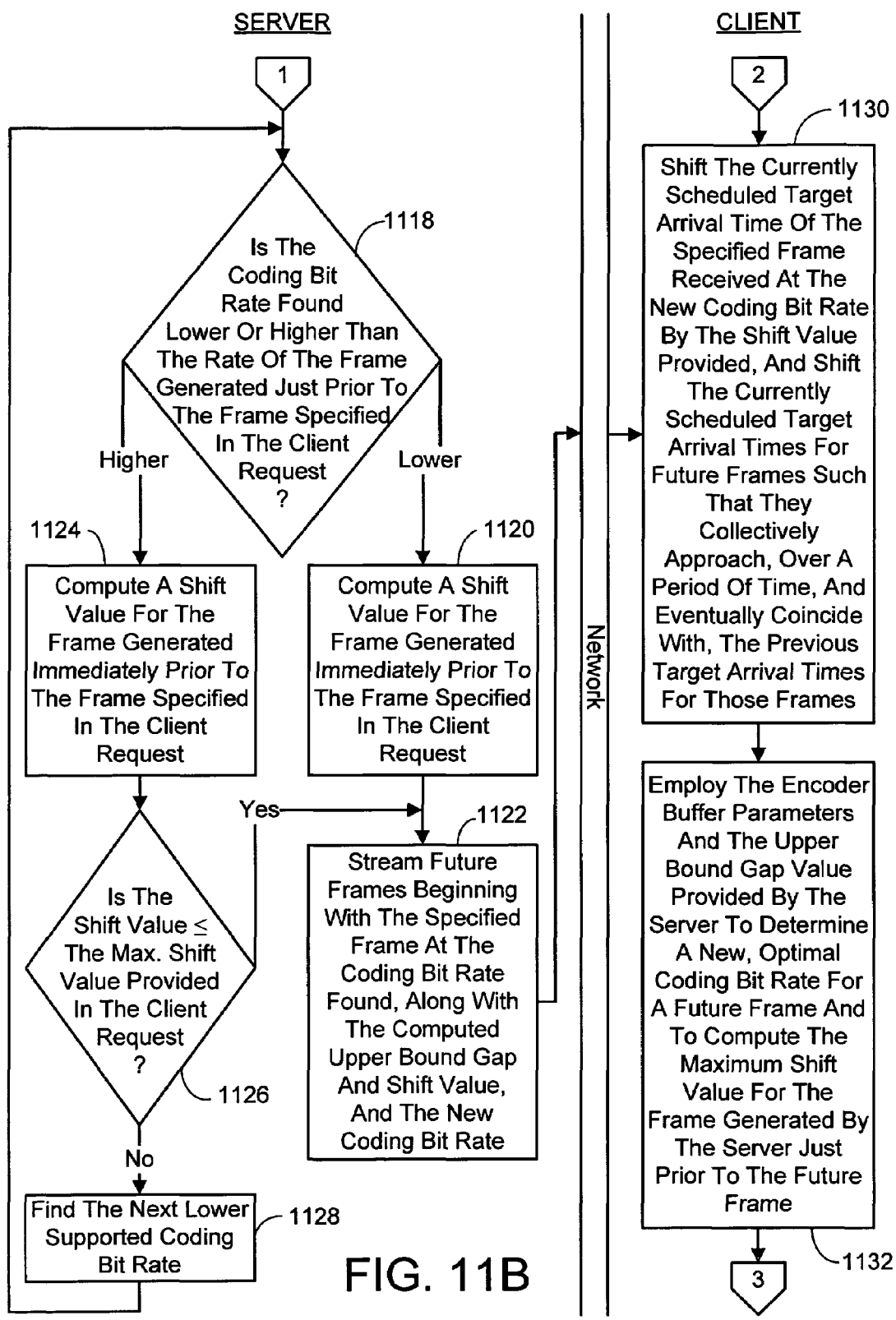
Figure 11C:
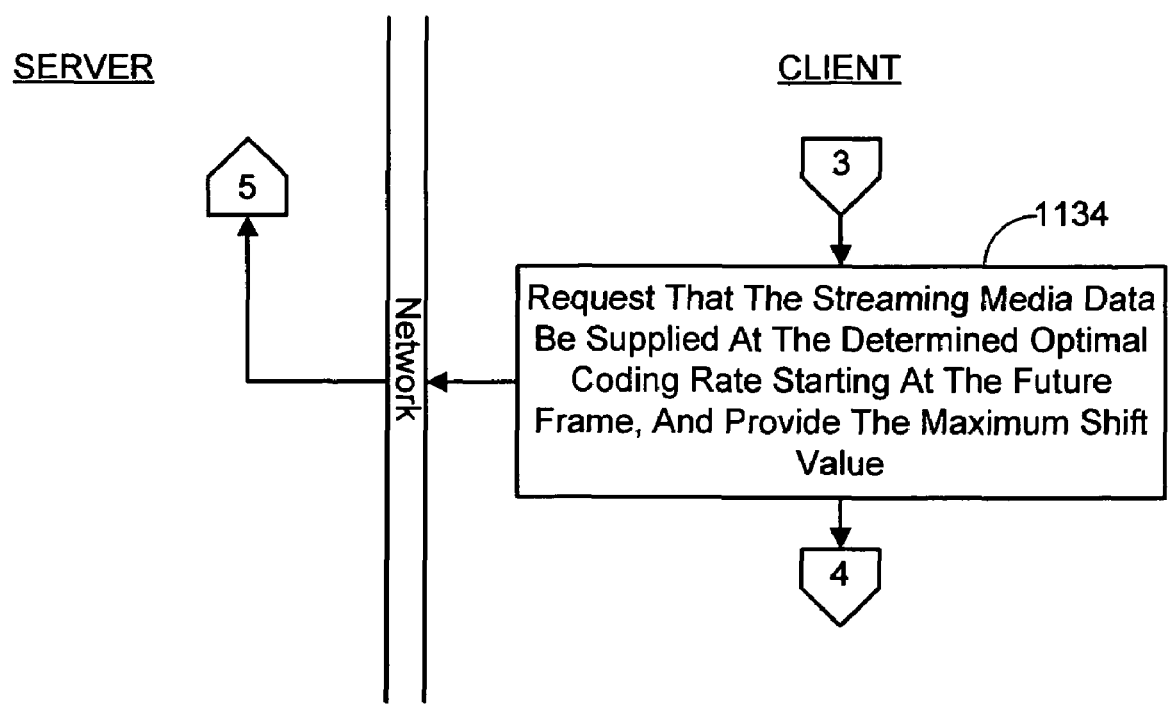

Referring to FIGS. 11A-C, the server first computes a set of parameters defining an initial state of the encoder buffer as it would exist if a data stream corresponding to a supported coding bit rate were streamed therefrom, for each of the supported coding bit rates (process action 1100). These parameters, which include the coding bit rate associated with the data stream, the size of the encoder buffer employed with the coding bit rate of the data stream, and a value indicative of the initial encoder buffer fullness exhibited at the coding bit rate of the data stream, are provided to the client in a preamble to the streaming media data (process action 1102). The server then streams the media data to the client at a prescribed initial coding bit rate, during a startup period (process action 1104). As the data is streamed, the server computes the upper bound gap for each frame generated for each coding bit rate supported by the server (process action 1106). Initially, the client employs the encoder buffer parameters to determine on a frame-by-frame basis a new, optimal coding bit rate for a future frame (process action 1108). In addition, the client computes the aforementioned maximum allowable difference value for the frame generated by the server just prior to the future frame, i.e., the maximum shift value (process action 1110). The client also begins playback of the frames it has received as soon as the client's decoder buffer has the minimum amount of data therein that is needed to ensure an underflow condition does not occur at the initial coding bit rate and continues to playback each frame received thereafter (process action 1112). In addition, once the aforementioned startup period is over, the client requests that the streaming media data be supplied at a new coding bit rate corresponding to the determined optimal coding rate, starting at the future frame, and provides the maximum shift value along with the request (process action 1114).

The server finds a supported coding bit rate that is equal to, or if none are equal, the closest smaller rate to, the optimum coding bit rate requested by the client (process action 1116). It is next determined by the server if the supported coding bit rate found is lower or higher than the coding bit rate associated with the frame generated immediately prior to the frame specified in the client request (process action 1118). If it is lower, then server computes the aforementioned shift value for the frame generated immediately prior to the frame specified in the client request (process action 1120), and generates all future frames beginning with the frame specified by the client at the supported rate found and streams them to the client, along with the computed upper bound gap and shift value, and an indication of the new coding bit rate (process action 1122). However, if the supported coding bit rate found is higher, then server computes the shift value for the frame generated immediately prior to the frame specified in the client request (process action 1124) and then determines if the shift value is less than or equal to the maximum shift value provided in the client request (process action 1126). If the shift value is less than or equal to the maximum shift value, then the server generates all future frames beginning with the frame specified by the client at the supported coding bit rate found and streams them to the client, along with the computed upper bound gap and shift value, and an indication of the new coding bit rate (process action 1122). But, if the shift value is greater than the maximum shift value, then the next lower supported coding bit rate is found (process action 1128) and the process actions 1118 through 1128 are repeated.

The client shifts the currently scheduled target arrival time associated with a just received first frame at the new coding bit rate by the shift value provided, and shifts the currently scheduled target arrival times for future frames such that they collectively approach, over a period of time, and eventually coincide with, the previous target arrival times for those frames (process action 1130). The client then employs the encoder buffer parameters and the upper bound gap value provided by the server to determine a new, optimal coding bit rate for a future frame and to compute the maximum shift value for the frame generated by the server just prior to the future frame (process action 1132). The client requests that the streaming media data be supplied at a new coding bit rate corresponding to the determined optimal coding rate starting at the future frame specified by the client, and includes the computed maximum shift value (process action 1134). Process actions 1116 through 1134 are then repeated for the duration of the streaming media data transmission.

VI. Multiple Bit Rate Streaming

Multiple bit rate (MBR) streaming is a network adaptive technique that is widely used in commercial streaming media systems. In MBR streaming, in contrast to scalable streaming, the content is encoded into several (typically 5-7) independent streams at different coding bit rates. Often, each stream is optimized for a common type of network connection (e.g., dial-up, DSL, cable). During an MBR streaming session, the proper coding bit rate is dynamically selected based on the available network bandwidth, with the goal of achieving the maximum possible quality under the condition of uninterrupted playback. It is easy to see that MBR streaming is analogous to scalable streaming. Indeed MBR streaming can be viewed as a special case of scalable streaming with a limited number of coding bit rates available. Hence, the foregoing optimal control approach should be applicable to this case.

There are, however, several differences that complicate MBR streaming, which need to be carefully addressed. First, as just mentioned, in MBR streaming there are only a limited number of coding bit rates available. This coarse quantization of the desired coding bit rate introduces a significant nonlinearity into the closed loop system. In fact, the large gaps between the available coding bit rates introduce oscillations. For example, if two neighboring coding bit rates straddle a constant arrival rate, the controller will oscillate between the two coding bit rates in an attempt to keep the client buffer at a target level.

Second, in MBR streaming the coding bit rate cannot be switched at an arbitrary time. In fact, before the server can switch to a new stream, it may have to wait for the next clean point (e.g., I frame) in the new stream, which could be five or ten seconds away. Thus, the old coding bit rate may continue for quite a while before it changes to the new coding bit rate. From the controller's perspective, this long random extra delay tends to destabilize the closed-loop system.

Third and finally, in MBR streaming, server performance issues are critical. The commercial-grade streaming media systems that use MBR streaming do so because of the minimal computational load that it imposes on the server compared to scalable streaming. Thus, for MBR streaming it is important to keep almost all computation and state maintenance on the client side. In particular, the server will not be able to update the leaky bucket information for each stream. Instead, the client must use some mechanism for estimating and maintaining this information.

A. Conservative Up-Switching

In this subsection, a technique to help stabilize the control system and reduce steady state oscillations to a period of at least a minute is described. With this technique, rapid down-switching is permitted. In fact, the value of or is reduced from 2000 to 500, changing the balance between responsiveness and smoothness of the coding bit rate in favor of rapid switching response. However, only conservative up-switching is permitted. Conservative up-switching ensures that spurious changes in coding bit rate do not occur, and that oscillations in the coding bit rate have a low frequency. In particular, conservative up-switching reduces the oscillations between two adjacent but widely spaced MBR coding bit rates, one above the arrival rate and one below the arrival rate.

In one embodiment, conservative up-switching establishes a conservative limit that limits the coding bit rate to no more than the arrival rate. However, in another embodiment, the method behind conservative up-switching is to establish a conservative limit on how high the coding bit rate can be raised above the arrival rate. If the current coding bit rate is below the arrival rate, and the client buffer duration begins to increase above its target level, then the coding bit rate can be switched up to a new coding bit rate above the arrival rate only if the new coding bit rate is below the conservative limit. When the client buffer duration begins at the target level, the conservative limit is equal to the arrival rate. However, as the client buffer duration increases, the conservative limit increases as well. Thus, if the current coding bit rate is below the arrival rate, and the next higher coding bit rate is above the arrival rate, then it will be possible to switch up to the next higher coding bit rate only after the client buffer duration has increased sufficiently so that the conservative limit rises above the higher coding bit rate. Once the coding bit rate is switched up to the higher coding bit rate, the client buffer begins to drain since the coding bit rate is then above the arrival rate. Eventually, when the buffer drains back below its target level, the controller will rapidly switch the coding bit rate back down to the coding bit rate below the arrival rate.

Given the current client buffer duration, the conservative limit is set to a value such that if the coding bit rate is switched up to a new coding bit rate at this value, the client buffer would take at least $\Delta t$ seconds of client time to drain back to the target level. Thus, the mechanism ensures that the period of oscillation will be at least $\Delta t$ seconds. In tested embodiments of the present system and process, $\Delta t$ is set to 60 seconds.

Figure 12:
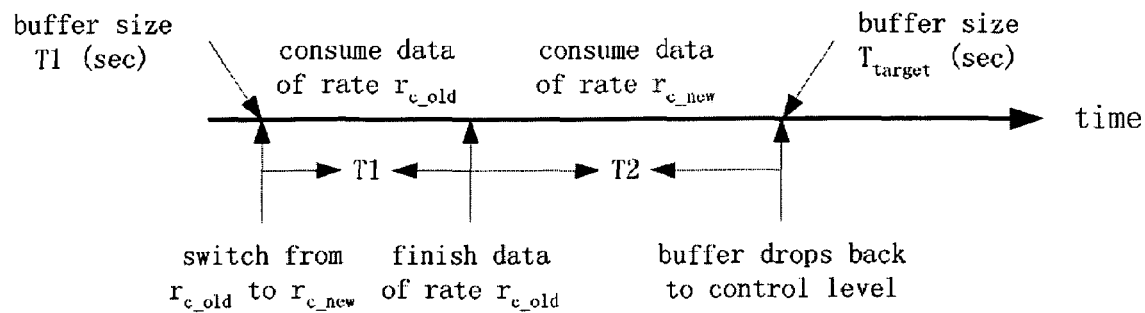
FIG. 12 is a timeline illustrating the conservative limit used in the conservative coding bit rate up-switching procedure.

FIG. 12 shows how the conservative limit is computed. Let $\Delta \tau_1$ be the client buffer duration (in media time) at the moment that the coding bit rate is switched up from $r_c^{old}$ to $r_c^{new}$. Thus $\Delta \tau_1$ is the number of seconds of content that will be consumed at the old coding bit rate $r_c^{old}$ before content at the new coding bit rate begins to be consumed. (For simplicity it is assumed that all of the content in the client buffer at the time of the switch is coded at rate $r_c^{old}$.) Let $\Delta \tau_2$ be the number of seconds of content that is consumed at the new coding bit rate $r_c^{new}$ before the client buffer duration drops to some level $\Delta\tau_3$ seconds (in media time), greater than the target level $\Delta\tau_T$. The duration of this phase is determined such that the total time since the switch is exactly $\Delta t=(\Delta\tau_1+\Delta\tau_2)/v$ seconds (in client time). Now, the number of bits that arrive in this time is $r_a\Delta t=r_c^{new}(\Delta\tau_2+\Delta\tau_3) \geq r_c^{new}(\Delta\tau_2+\Delta\tau_T)=r_c^{new}(v\Delta t-\Delta\tau_1+\Delta\tau_T)$, or $$r_c^{new} \leq \frac{r_a \Delta t}{v\Delta t - \Delta\tau_1 + v\Delta t_T}, \quad (60)$$

where $\Delta t_T$ is the target buffer duration in client time. The parameter $\Delta t$ can be tuned to yield the desired behavior. A large $\Delta t$ means that up-switching will be more conservative, while a smaller $\Delta t$ means that up-switching will be more prompt. In tested embodiments, $\Delta t$ is set to 60 seconds while the target $\Delta t_T$ is typically about 10 seconds.

B. Buffer Tube Upper Bound Estimation

In Section V-D it was specified that the server sends three values to the client at the beginning of each change in coding bit rate: the new coding bit rate $\hat{r}_c^{new}$, the current gap to the upper bound $g^{new}(n)$, and the control target shift $\Delta g(n-1)=g^{new}(n-1)-g^{old}(n-1)$. The server computes the latter two values by running a leaky bucket simulator for each coding bit rate. The client continues to update $g(n)$ for the new coding bit rate by running its own leaky bucket simulator for the new coding bit rate. That is, beginning with the initial condition $F^e(n)=B-b(n)-g^{new}(n)$, for each successive frame the client computes $$B^e(n) = F^e(n) + b(n) \quad (61)$$

$$F^e(n+1) = \max\{0, B^e(n) - \hat{r}_c / f(n)\}, \quad (62)$$

where $$f(n) = \frac{1}{\tau(n+1) - \tau(n)} \quad (63)$$

is the instantaneous frame rate, as in Eqs. (2), (3) and (4). From this, the client can compute $$g(n)=B-B^e(n) \quad (64)$$

for each frame.

However, if the server is unable to simulate the leaky buckets and cannot send $g^{new}(n)$ to the client, then the client must estimate this information for itself. In this case it is recommended that the client estimates $g^{new}(n)$ as an upper bound such as $\hat{g}^{new}(n)=B-b(n) \geq g^{new}(n)$. Then, beginning with initial condition $\hat{F}^e(n)=B-b(n)-\hat{g}^{new}(n)$ (which equals 0 in this case), for each successive frame the client computes $$\hat{B}^e(n)=\hat{F}^e(n)+b(n) \quad (65)$$

$$\hat{F}^e(n+1)=\max\{0,\hat{B}^e(n)-\hat{r}_c/f(n)\} \quad (66)$$

as well as $$\hat{g}(n)=B-\hat{B}^e(n) \quad (67)$$

It is easy to see by induction that $\hat{F}^e(n) \leq F^e(n)$, $\hat{B}^e(n) \leq B^e(n)$, and $\hat{g}(n) \geq g(n)$. Moreover, these bounds each become tighter by $\delta(n)=\hat{r}_c/f(n)-\hat{B}^e(n)$ whenever $\delta(n)>0$, i.e., whenever $\hat{F}^e(n+1)$ is clipped to 0 in Eq. (66). In fact, given enough time they may eventually become tight.

Note that whenever the bounds tighten by $\delta(n)>0$, the control target must be shifted by $\Delta g(n)/\tilde{r}_a$, where $\Delta g(n)=-\delta(n)$. Furthermore, whenever n is the first frame of a new coding bit rate, the control target should be shifted by $\Delta g(n)/\tilde{r}_a$, where $\Delta g(n)=\hat{g}^{new}(n)-\hat{g}^{old}(n)$. Here, $\hat{g}^{old}(n)$ can be determined by running Eqs. (65), (66) and (67) for one extra step, namely if n is the first frame of the new coding bit rate, $$\hat{F}^e(n)=\max\{0,\hat{B}^e(n-1)-\hat{r}_c^{old}/f(n-1)\} \quad (68)$$

$$\hat{B}^e(n)=\hat{F}^e(n)+b(n) \quad (69)$$

$$\hat{g}^{old}(n)=B-\hat{B}^e(n) \quad (70)$$

It is easy to see that if $\hat{g}^{new}(n)=B-b(n)$, then $\Delta g(n)=\hat{F}^e(n)$ as computed in Eq. (68).

VII. Sender-Driven Streaming

The preceding discussions have assumed that the control process for adapting the stream or its bit rate to the prevailing conditions is located within the client. This is called receiver-driven streaming because the client (i.e., the receiver) makes the decisions and informs the server (i.e., the sender). However, it should be clear that sender-driven streaming is also possible, in which the control process operates at the sending side. For example, using TCP for transmission of the streaming media data, the control process can operate at the server, measuring the transmission times of each frame and estimating the transmission rate, instead of the control process operating at the client, measuring the arrival times of each frame and estimating the arrival rate. Using TCP, the transmission time of a frame is substantially the same as its arrival time, and likewise the transmission rate is substantially the same as its arrival rate; hence these can be used interchangeably. Generally, the transmission time or the arrival time of a packet may be called a time stamp. In sender-driven streaming, the server can infer the state of the client buffer by knowing what it has already transmitted and by knowing the playout times for the transmitted frames. Sender-driven streaming reduces the overhead of communicating control information between the client and the server, but it also increases the computational burden on the server. In some situations, this may be a desirable trade-off. Those skilled in the art will appreciate that it is possible to appropriately modify the protocols described herein to cases where the control algorithm resides in the server or in another location, rather than in the client.

VII. REFERENCES

[1] G. J. Conklin, G. S. Greenbaum, K. O. Lillevold, A. F. Lippman, and Y. A. Reznik. Video coding for streaming media delivery on the Internet. *IEEE Trans. Circuits and Systems for Video Technology*, 11(3):269-281, March 2001. special issue on Streaming Video.

[2] T. Wiegand and G. Sullivan. Joint video specification rec. h.264 & 14496-10 avc. Non-Final Draft of Final Draft International Standard (FDIS) JVT-G050, ITU-T & ISO/IEC, Pattaya, Thailand, March 2003.

[3] V. J. Ribeiro, R. H. Riedi, J. Navratil, L. Cottrell, and R. G. Baraniuk. pathchirp: efficient available bandwidth estimation for network paths. In *Proc. Passive and Active Measurement Workshop (PAM)*, La Jolla, Calif., April 2003.

[4] R. Rejaie, M. Handley, and D. Estrin. Layered quality adap-tation for Internet streaming video. *IEEE J. Selected Areas in Communications,* 18(12):2530-2543, December 2000.

[5] Q. Zhang, Y.-Q. Zhang, and W. Zhu. Resource allocation for multimedia streaming over the Internet. *IEEE Trans. Multimedia,* 3(3):339-355, September 2001.

[6] B.-J. Kim, Z. Xiong, and W. A. Pearlman. Low bit-rate scalable video coding with 3D set partitioning in hierarchical trees (3-D SPIHT). *IEEE Trans. Circuits and Systems for Video Technology,* 10(8): 1374-1387, December 2000.

[7] F. Wu, S. Li, and Y.-Q. Zhang. A framework for efficient progressive fine granularity scalable video coding. *IEEE Trans. Circuits and Systems for Video Technology,* 11(3): 301-317, March 2001.

[8] J. Li. Embedded audio coding (eac) with implicit psychoacoustic masking. In *Proc. Int'l Conf Multimedia,* pages 592-601, Nice, France, December 2002. ACM.

[9] P. de Cuetos and K. W. Ross. Adaptive rate control for streaming stored fine-grained scalable video. In *Proc. Int'l Workshop on Network and Operating Systems Support for Digital Audio and Video (NOSSDAV),* Miami Beach, Fla., May 2002.

[10] J. Ribas-Corbera, P. A. Chou, and S. Regunathan. A generalized hypothetical reference decoder for H.264/ AVC. *IEEE Trans. Circuits and Systems for Video Technology,* 13(7), July 2003.

[11] B. D. O. Anderson and J. B. Moore. *Optimal Control: Linear Quadratic Methods.* Prentice Hall, 1990.

[12] S. Keshav. Packet-pair flow control. http://www.cs.cornell.edu/-skeshav/papers.html.

[13] P. A. Chou and Z. Miao, "Rate-distortion optimized streaming of packetized media," *Microsoft Research Technical Report MSR-TR*-2001-35, February 2001.

Wherefore, what is claimed is:

1. A computer-implemented process for controlling a coding bit rate of streaming media data being transmitted to a client from a server over a computer network, comprising using the server to perform the following process actions:
   generating a streaming media data stream which exhibits a coding bit rate supported by the server, and which after an initial startup period exhibits a coding bit rate related to a rate requested by the client;
   computing parameters indicative of the state of an encoder buffer of the server, wherein said encoder buffer is used to stage portions of the streaming media data prior to transmission to the client, and wherein for each coding bit rate supported by the server, computing said parameters comprises computing a set of parameters defining an initial state of the encoder buffer as it would exist if a data stream corresponding to the coding bit rate were streamed therefrom, and wherein said encoder buffer parameters comprise the coding bit rate associated with the data stream, the size of the encoder buffer employed with the coding bit rate of the data stream, and a value indicative of the initial encoder buffer fullness exhibited at the coding bit rate of the data stream; and
   providing the encoder buffer state parameters and the streaming media data stream to the client, whereby said parameters are usable by the client to establish, on an ongoing basis, a current coding bit rate for the streaming media data, which is estimated will provide a high quality playback of the streaming media data while still keeping a decoder buffer of the client, used to receive streaming media data from the server, filled to a desired duration level so as to reduce the chance of an underflow condition which would result in an interruption of the playback of the streaming media data by the client.

2. The process of claim 1, wherein the process action of generating the streaming media data stream, comprises an action of forming the streaming media data stream using a fine grain scalable stream forming technique.

3. The process of claim 2, wherein the process action of forming the streaming media data stream using the fine grain scalable stream forming technique comprises the actions of:
   accessing a media file comprising data units making up the stream media data, each unit of which is tagged with an indicator representing a per-bit decrease in distortion in the playback of the streaming media data if that data unit is received by the client;
   establishing a series of threshold values each of which identifies an overall number of bits and so to a coding bit rate of a data stream comprising just those data units that exceed the particular threshold under consideration; and
   generating a data stream at a particular coding bit rate by reading a data unit from the media file and including it in the data stream if the threshold associated with that data stream is less than the indicator tagged to the data unit.

4. The process of claim 3, wherein the process action of establishing a series of threshold values comprises the actions of:
   identifying a discrete number of data streams corresponding to different desired coding bit rates that are supported by the server; and
   establishing a threshold for each identified data stream which results in the stream having a one of desired coding bit rates.

5. The process of claim 4, wherein the process action of identifying a discrete number of data streams corresponding to different desired coding bit rates, comprises an action of choosing thresholds so as to make the coding bit rates of the corresponding data streams uniformly spaced in the log domain between prescribed upper and lower coding bit rate limits.

6. The process of claim 1, wherein the process action of generating the streaming media data stream, comprises an action of forming the streaming media data stream using a coarse grain scalable stream forming technique.

7. The process of claim 6, wherein the process action of forming the streaming media data stream using the coarse grain scalable stream forming technique comprises the actions of:
   identifying a discrete number of different coding bit rates that are supported by the server;
   accessing a media file comprising hierarchical sub-streams that when combined in an incremental order from the lowest to the highest produce data streams exhibiting progressively increasing coding bit rates corresponding to said rates supported by the server; and
   generating the data stream at a desired coding bit rate which is supported by the server by combining the number of the sub-streams necessary to produce that coding bit rate.

8. The process of claim 1, wherein the process action of generating the streaming media data stream, comprises an action of forming the streaming media data stream using a multiple bit rate stream forming technique.

9. The process of claim 8, wherein the process action of forming the streaming media data stream using the multiple bit rate stream forming technique comprises the actions of:
   identifying a discrete number of different coding bit rates that are supported by the server;

accessing a media file comprising a plurality of data streams each exhibiting a different coding bit rate that corresponds to a one of said rates supported by the server; and reading a data stream from the media file which corresponds to a desired coding bit rate supported by the server.

10. The process of claim 1, wherein the process action of providing the encoder buffer state parameters and the streaming media data stream to the client, comprises an action of providing the encoder buffer parameters computed for each data stream exhibiting one of the supported coding bit rates to the client as part of a preamble sent to the client prior to sending the streaming media data.

11. The process of claim 1, wherein the size of the encoder buffer employed with the coding bit rate of the data stream is chosen so as to be the minimum size buffer that will still contain the data stream at any point in the streaming process given the coding bit rate and the initial encoder buffer fullness.

12. The process of claim 1, further comprising a process action of the server computing an upper bound gap for each frame of the streaming media data generated for each coding bit rate supported by the server, wherein the upper bound gap is defined as the number of data bits that the server's encoder buffer can contain over the bits currently contained therein after a just-generated frame is fully input into the encoder buffer.

13. The process of claim 12, wherein the process action of computing an upper bound gap for each frame, comprises the action of computing the difference between the encoder buffer size and the last computed value for an encoder buffer fullness after insertion of the just-generated frame, wherein the encoder buffer fullness value after insertion of the just-generated frame is computed as the sum of the last computed value of the encoder buffer fullness value prior to insertion of the just-generated frame and the size of that just-generated frame, and wherein the encoder buffer fullness value prior to insertion of the just-generated frame is computed as either zero, or the difference between the value computed for the encoder buffer fullness after the insertion of the frame generated immediately before the just-generated frame and the coding bit rate associated with that prior frame divided by an instantaneous frame rate associated with said prior frame, whichever is larger.

14. The process of claim 13, wherein the instantaneous frame rate is equal to the reciprocal of, the time the next frame is scheduled to be encoded less the time the just-generated frame was encoded.

15. The process of claim 12, further comprising a process action of providing the upper bound gap computed for the first frame of a sequence of frames exhibiting a coding bit rate that is different from that associated with the frame generated immediately before the first frame of said sequence of frames, to the client along with an indication of the coding bit rate associated with the sequence of frames, said gap value and coding bit rate being provided with said first frame of the sequence.

16. The process of claim 15, wherein the client estimates the upper bound gap for frames provided by the server that do not include the associated gap value.

17. The process of claim 16, wherein the client employs the encoder buffer parameters and the upper bound gap values to determine on a frame-by-frame basis the coding bit rate that will keep the client buffer approximately at the desired level, said determining comprising identifying a coding bit rate that reduces a difference between an estimated latest anticipated arrival time of the frame under consideration and a prescribed target arrival time.

18. The process of claim 17, wherein the client's estimating of the latest anticipated arrival time of a frame under consideration, comprises:

re-estimating the latest anticipated arrival time associated with the frame immediately preceding the frame under consideration as if the frame immediately preceding the frame under consideration exhibited the current coding bit rate;

adding said re-estimated time to the current coding bit rate divided by the product of an instantaneous frame rate and an estimate of the arrival rate of the frames.

19. The process of claim 18, wherein the client's re-estimating of the latest anticipated arrival time associated with the frame immediately preceding the frame under consideration comprises adding the actual arrival time of said immediately preceding frame as measured by the client, to the upper bound gap associated with the immediately preceding frame divided by the estimated arrival rate associated with said immediately preceding frame.

20. The process of claim 15, further comprising the process actions of:

the server computing a shift value for each frame representing the first frame of the sequence of frames exhibiting a coding bit rate that is different from the frame generated immediately before this first frame of the sequence, said shift value representing a difference between the upper bound gap that would be associated with the frame generated immediately before the first frame of the sequence had it been encoded at the current coding bit rate and the upper bound gap actually associated with the frame generated immediately before the first frame of the sequence encoded at the previous coding bit rate; and providing the shift value computed for the first frame of each sequence of frames exhibiting a coding bit rate that is different from the frame generated immediately before the first frame of the sequence, to the client with the data comprising this first frame.

21. The process of claim 20, wherein whenever a frame is provided to the client which has a different coding bit rate than the immediately preceding frame, the currently scheduled target arrival time associated with the just received frame is shifted by the shift value provided with the just-received frame and the currently scheduled target arrival times for future frames are shifted such that they collectively approach over a period of time and eventually coincide with the previous target arrival times for those frames.

22. The process of claim 20, wherein the process actions for computing an upper bound gap for each frame of the streaming media data generated for each coding bit rate supported by the server and for computing a shift value for each frame representing the first frame of the sequence of frames exhibiting a coding bit rate that is different from the frame generated immediately before this first frame of the sequence, comprise computing the upper bound gap and shift values prior to streaming the streaming media data.

23. The process of claim 20, wherein the process actions for computing an upper bound gap for each frame of the streaming media data generated for each coding bit rate supported by the server and for computing a shift value for each frame representing the first frame of the sequence of frames exhibiting a coding bit rate that is different from the frame generated immediately before this first frame of the sequence, comprise computing the upper bound gap and shift values at the time the affected frames are generated.

24. The process of claim 12, wherein a limited number of coding bit rates are supported by the server, and wherein the process action of generating a streaming media data stream which exhibits a coding bit rate supported by the server, and which after an initial startup period exhibits a coding bit rate related to a rate requested by the client, comprises the actions of:
(a) receiving a coding bit rate request from the client;
(b) finding a supported coding bit rate that is equal to, or if none are equal, the closest smaller rate to, the requested coding bit rate;
(c) whenever a supported coding bit rate is found that is a lower rate than the coding bit rate associated with the last generated frame of the streaming media data, generating all future frames at that supported rate; and
(d) whenever a supported coding bit rate is found that is a higher rate than the coding bit rate associated with the last generated frame of the streaming media data, determining if a difference, between the upper bound gap associated with the last generated frame had it been encoded at the supported coding bit rate found and the upper bound gap associated with that frame encoded at the current coding bit rate, is less than or equal to a maximum allowable difference value,
whenever the difference is less than the maximum allowable difference value, generating all future frames at the found supported rate, and
whenever the difference is not less than the maximum allowable difference value, finding the next lower supported coding bit rate and repeat actions (c)-(d).

25. The process of claim 24, wherein the maximum allowable difference value is received from the client along with the coding bit rate request.

26. The process of claim 25, wherein the client chooses the maximum allowable difference value such that a latest anticipated arrival time associated with a frame provided by the server immediately prior to a frame under consideration by the client had it been coded at the requested coding bit rate is no more than a prescribed fraction of the way from that frame's target arrival time to its playback deadline.

27. The process of claim 26, wherein the prescribed fraction is ⅓.

28. The process of claim 26, wherein as the coding bit rate associated with the last frame (n) provided to the client and the frame (n+1) currently being streamed to the client has already been set and the coding bit rate is only changed on a frame-by-frame basis, the frame under consideration by the client for which the coding bit rate is being requested is the next frame (n+2) of the streaming media data yet to be generated by the server.

29. The process of claim 1, wherein process action of generating a streaming media data stream which exhibits a coding bit rate supported by the server, comprises the action of, during the initial startup period, generating the data stream at a coding bit rate that is approximately one-half the anticipated transmission rate from the server at the current bandwidth available on the network.

30. The process of claim 1, further comprising a process action of providing an indication of the coding bit rate associated with a sequence of frames exhibiting a coding bit rate that is different from that associated with the frame generated immediately before the first frame of said sequence of frames, to the client, said indication being provided with said first frame of the sequence.

31. The process of claim 30, wherein the client estimates an upper bound gap for each frame received by the client, wherein the upper bound gap is defined as the number of data bits that the server's encoder buffer can contain over the bits currently contained therein after the just-received frame was fully input into the encoder buffer, said client estimating comprising:
computing what the encoder buffer fullness value would have been after the last received frame was placed therein as the sum of the last computed value of the encoder buffer fullness prior to insertion of the last received frame and the size of that last received frame,
wherein the encoder buffer fullness value prior to insertion of the last received frame associated with the first frame received by the client at the current coding bit rate of the streaming media is assumed to be zero regardless of its actual value,
and wherein the encoder buffer fullness value prior to insertion of a last received frame associated with each subsequent frame received by the client at the current coding bit rate is deemed to be either zero, or the difference between the last computed value for the encoder buffer fullness after the insertion of the last received frame and the coding bit rate divided by the instantaneous frame rate, whichever is larger, wherein the instantaneous frame rate is equal to the reciprocal of a scheduled playback time of the next frame to be received by the client less a scheduled playback time of the last received frame; and
computing the upper bound gap associated with the last received frame as the encoder buffer size less the last computed value for the encoder buffer fullness after insertion of the last received frame.

32. The process of claim 31, wherein whenever a frame is received by the client which has a different coding bit rate than the immediately preceding frame, the client performs the actions of:
shifting the currently scheduled target arrival time associated with the just received frame by a shift value, wherein said shift value represents a difference between the upper bound gap of the frame and the upper bound gap that would be associated with the frame had it been coded at the immediately preceding coding bit rate;
shifting the currently scheduled target arrival times for future frames such that they, collectively approach over a period of time, and eventually coincide with, the previous target arrival times for those frames; and
shifting each shifted frame by the difference between the encoder buffer fullness value after insertion of the last received frame and the current coding bit rate, divided by the frame rate, and then divided by the estimated arrival rate associated with the last received frame.

33. The process of claim 32, wherein the upper bound gap that would be associated with the frame had it been coded at the immediately preceding coding bit rate is computed as the encoder buffer size less the last computed value for the encoder buffer fullness value after insertion of the last received frame, wherein the encoder buffer fullness value after insertion of the last received frame is computed as the sum of the last computed value of the encoder buffer fullness value prior to insertion of the last received frame and the size of that last received frame, and wherein the encoder buffer fullness value prior to insertion of the last received frame is computed as either zero, or the difference between the value computed for the encoder buffer fullness after the insertion of the frame received prior to the last received frame and the immediately preceding coding bit rate divided by the instantaneous frame rate associated with the frame received prior to the last received frame, whichever is larger.

34. A computer-readable medium having computer-executable instructions for performing the process actions recited in claim 1.

35. A system for controlling a coding bit rate of streaming media data being transmitted to a client from a server over a computer network, comprising:
a general purpose server computing device;
a computer program comprising program modules executable by the computing device, wherein the computing device is directed by the program modules of the computer program to,
generate a streaming media data stream which exhibits a coding bit rate supported by the server, and which after an initial startup period exhibits a coding bit rate related to a rate requested by the client,
compute parameters indicative of the state of an encoder buffer of the server, said encoder buffer being used to stage portions of the streaming media data prior to transmission to the client, and wherein computing parameters indicative of the state of an encoder buffer, comprises,
computing, for each coding bit rate supported by the server, a set of parameters defining an initial state of the encoder buffer as it would exist if a data stream corresponding to the coding bit rate were streamed therefrom, wherein said encoder buffer parameters comprise the coding bit rate associated with the data stream, the size of the encoder buffer employed with the coding bit rate of the data stream, and a value indicative of the initial encoder buffer fullness exhibited at the coding bit rate of the data stream, and
computing an upper bound gap for each frame of the streaming media data generated for each coding bit rate supported by the server, wherein the upper bound gap is defined as the number of data bits that the server's encoder buffer can contain over the bits currently contained therein after a just-generated frame is fully input into the encoder buffer, and
provide the encoder buffer state parameters and the streaming media data stream to the client, wherein the parameters are useable by the client to establish, on an ongoing basis, said rate requested by the client.

36. The system of claim 35, wherein the program module for providing the encoder buffer state parameters and the streaming media data stream to the client, comprises sub-modules for:
providing the encoder buffer parameters computed for each data stream exhibiting one of the supported coding bit rates to the client as part of a preamble sent to the client prior to sending the streaming media data; and
providing with the data comprising each frame of the steaming media data, the upper bound gap computed for that frame for the coding bit rate exhibited thereby.

37. The system of claim 36, wherein the client employs the encoder buffer parameters and the upper bound gap values to determine on a frame-by-frame basis the coding bit rate that will keep a client buffer approximately at a desired level, said determining comprising identifying a coding bit rate that reduces a difference between an estimated latest anticipated arrival time of the frame under consideration and a prescribed target arrival time.

38. The system of claim 37, wherein the client's estimating of the latest anticipated arrival time of a frame under consideration, comprises:
re-estimating the latest anticipated arrival time associated with the frame immediately preceding a frame under consideration as if the frame immediately preceding the frame under consideration exhibited the current coding bit rate;
adding said re-estimated time to the current coding bit rate divided by the product of an instantaneous frame rate and an estimate of the arrival rate of the frames.

39. The system of claim 38, wherein the client's re-estimating of the latest anticipated arrival time associated with the frame immediately preceding the frame under consideration comprises adding the actual arrival time of said immediately preceding frame as measured by the client, to the upper bound gap associated with the immediately preceding frame divided by the estimated arrival rate associated with said immediately preceding frame.

40. A computer-implemented process for controlling a coding bit rate of streaming media data being transmitted to a client from a server over a computer network, comprising:
a generating step for generating a streaming media data stream which exhibits a coding bit rate supported by the server, and which after an initial startup period exhibits a coding bit rate related to a rate requested by the client;
a computing step for computing parameters indicative of the state of an encoder buffer of the server, said encoder buffer being used to stage portions of the streaming media data prior to transmission to the client;
a second computing step for computing an upper bound gap for each frame of the streaming media data generated for each coding bit rate supported by the server, wherein the upper bound gap is defined as the number of data bits that the server's encoder buffer can contain over the bits currently contained therein after a just-generated frame is fully input into the encoder buffer; and
a providing step for providing the encoder buffer state parameters and the streaming media data stream to the client, whereby said parameters are usable by the client to establish, on an ongoing basis, a current coding bit rate for the streaming media data, which is estimated will provide a high quality playback of the streaming media data while still keeping a decoder buffer of the client, used to receive streaming media data from the server, filled to a desired duration level so as to reduce the chance of an underflow condition which would result in an interruption of the playback of the streaming media data by the client; wherein
a limited number of coding bit rates are supported by the server, and wherein as the coding bit rate associated with the last frame provided to the client and the frame currently being streamed to the client has already been set and the coding bit rate is only changed on a frame-by-frame basis, the frame under consideration by the client for which a coding bit rate is requested is a frame of the streaming media data yet to be generated by the server and which frame is identified in the client request as the first frame that is to be encoded at the new coding bit rate, and wherein the generating step, comprises,
(a) a receiving step for receiving a coding bit rate request from the client along with the identity of the first frame that the requested rate is to apply to,
(b) a finding step for finding a supported coding bit rate that is equal to, or if none are equal, the closest smaller rate to, the requested coding bit rate,
(c) a producing step for, whenever a supported coding bit rate is found that is a lower rate than the coding bit rate associated with the last generated frame of the streaming media data, producing the identified first frame and all future frames generated thereafter at that supported rate, and (d) a determining step for, whenever a supported coding bit rate is found that is a higher rate than the coding bit rate associated with a frame immediately preceding the identified first frame associated with the requested new coding bit rate, determining if a difference, between the upper bound gap associated with said immediately preceding frame if it is encoded at the supported coding bit rate found and the upper bound gap associated with that frame encoded at the current coding bit rate, is less than or equal to a maximum allowable difference value, a second producing step for, whenever the difference is less than the maximum allowable difference value, producing the identified first frame and all future frames generated thereafter at that supported rate, and a second finding step for, whenever the difference is not less than the maximum allowable difference value, finding the next lower supported coding bit rate and repeat steps (c)-(d).

41. The process of claim 40, wherein the maximum allowable difference value is received from the client along with the coding bit rate request.

\* \* \* \* \*